(12) United States Patent
Yoon et al.

(10) Patent No.: US 11,843,412 B2
(45) Date of Patent: Dec. 12, 2023

(54) ELECTRONIC DEVICE FOR PERFORMING RANGING BY USING ULTRA WIDE BAND COMMUNICATION AND OPERATING METHOD THEREOF

(71) Applicant: Samsung Electronics Co., Ltd., Suwon-si (KR)

(72) Inventors: Kangjin Yoon, Suwon-si (KR); Sehee Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/860,381

(22) Filed: Jul. 8, 2022

(65) Prior Publication Data
US 2022/0345178 A1    Oct. 27, 2022

Related U.S. Application Data

(63) Continuation of application No. 17/166,519, filed on Feb. 3, 2021, now Pat. No. 11,411,602.

(30) Foreign Application Priority Data

Feb. 7, 2020 (KR) .................. 10-2020-0015008

(51) Int. Cl.
*H04W 4/02* (2018.01)
*H04B 1/7163* (2011.01)
*H04L 12/18* (2006.01)

(52) U.S. Cl.
CPC ....... *H04B 1/71632* (2013.01); *H04L 12/189* (2013.01); *H04B 2201/71634* (2013.01)

(58) Field of Classification Search
CPC ...... H04B 1/71632; H04B 2201/71634; H04L 12/189
See application file for complete search history.

(56) References Cited

U.S. PATENT DOCUMENTS

| 9,983,303 B2 | 5/2018 | Wisherd et al. |
| 2003/0080869 A1 | 5/2003 | Pellet et al. |
| 2007/0081505 A1 | 4/2007 | Roberts |
| 2008/0259896 A1 | 10/2008 | Sahinoglu et al. |

(Continued)

OTHER PUBLICATIONS

NPL—Apple Inc. et al. Digital Car Key—UWB MAC and Channel Access Specification, Aug. 8, 2019 (Year: 2019).*

(Continued)

*Primary Examiner* — Lan-Huong Truong
(74) *Attorney, Agent, or Firm* — Jefferson IP Law, LLP

(57) ABSTRACT

An electronic device, which performs ranging by using ultra wide band (UWB) communication, and an operating method of the electronic device, is provided. The operating method includes a first electronic device performing operations including transmitting a ranging control message including block striding information to a second electronic device, determining whether to perform hopping based on a result of transmitting the ranging control message, determining a hopping round value based on a result of determining whether to perform the hopping and the block striding information, and performing ranging with the second electronic device based on the block striding information and the hopping round value.

12 Claims, 20 Drawing Sheets

(56) References Cited

U.S. PATENT DOCUMENTS

| | | | | |
|---|---|---|---|---|
| 2011/0292819 A1* | 12/2011 | Ekbal | .................... | G01S 13/765 370/252 |
| 2012/0242501 A1* | 9/2012 | Tran | ...................... | A61B 5/742 340/870.02 |
| 2016/0277893 A1 | 9/2016 | Katabi et al. | | |
| 2017/0180938 A1* | 6/2017 | Smith | .................. | G01C 21/165 |
| 2018/0220263 A1 | 8/2018 | Jiang et al. | | |
| 2019/0271564 A1* | 9/2019 | Yu | .......................... | G01C 22/00 |
| 2020/0366335 A1 | 11/2020 | Lee et al. | | |

OTHER PUBLICATIONS

International Search Report dated May 20, 2021, issued in International Patent Application No. PCT/KR2021/001241.

Apple Inc. et al. Digital Car Key—UWB MAC and Channel Access Specification, Aug. 8, 2019 (Year: 2019).

Lee et al.; IEEE 802.15.4z MAC; IEEE P802.15 Wireless Personal Area Networks; XP068148470; Dec. 2018.

Lee et al.; IEEE 802.15.4z MAC for Ranging; IEEE P802.15 Working Group for Wireless Personal Area Networks (WPANs); XP068148435; Dec. 18, 2018.

LAN/MAN Standards Committee of the IEEE Computer; P802.15. 4z(TM)/D00 Draft Standard for Low-Rate Wireless Networks; Amendment: Enhanced Ultra Wide-Band (UWB) Physical Layers (PHYs) and Associated Ranging Techniques; XP068148949; Feb. 22, 2019; New York.

Ayman Naguib (Apple Inc); Updated text for P802.15.4z_D006e; IEEE P802.15 Wireless Personal Area Networks; XP068148570; Mar. 2019.

European Search Report dated Apr. 5, 2023; European Appln. No. 21750211.1-1206 / 4081825 PCT/KR2021001241.

European Search Report dated Sep. 20, 2023, issued in European Application No. 23191488.8.

* cited by examiner

| Parameter | Size (octets) | Notes | Mandatory/Optional |
|---|---|---|---|
| UWB message ID | 1 | 0x11 = Control Message Type 1 | M |
| Stride length | 1 or 2 | How many blocks will be skipped | M |
| Ranging device management list length | 1 | Number of elements in the ranging device management list field | M |
| Ranging device management list | Variable | List of ranging role, ranging slot index and address for ranging device | M |

1020

| Parameter | Size (bits) | Notes | Mandatory/Optional |
|---|---|---|---|
| Ranging role | 1 | 1: Initiator 0: Responder | M |
| Ranging slot index | 7 | Assigned slot | M |
| Address | 16 | Address of ranging device | M |

| Parameter | Size (octets) | Notes | Mandatory/Optional |
|---|---|---|---|
| UWB message ID | 1 | 0x11= Control Message Type 1 | M |
| Ranging device management list length | 1 | Number of elements in the ranging device management list field | M |
| Ranging device management list | Variable | List of ranging role, ranging slot index and address for ranging device | M |

1120

| Parameter | Size (bits) | Notes | Mandatory/Optional |
|---|---|---|---|
| Ranging role | 1 | 1: Initiator<br>0: Responder | M |
| Ranging slot index | 7 | Assigned slot | M |
| Stride length | 1 or 2 | How many blocks will be skipped | M |
| Address | 16 | Address of ranging device | M |

FIG. 15

| Octets: 1/2 | 0/1 | 0/2 | 0/2/8 | 0/2 | 0/2/8 | variable | variable | | 2/4 |
|---|---|---|---|---|---|---|---|---|---|
| Frame Control | Sequence Number | Destination PAN ID | Destination Address | Source PAN ID | Source Address | Auxiliary Security Header | IE | Frame Payload | FCS |
| | | | Addressing fields | | | | Header IEs / Payliad IEs | | |
| MHR | | | | | | | | MAC Payload | MFR |

| Parameter | Size (bits) | Notes | Mandatory/Optional |
|---|---|---|---|
| Length | 7 | Size of Content field | M |
| Element ID | 8 | 0=Vendor Specific Header IE | M |
| Type | 1 | 0=Header IE | M |
| Content | Variable | UWB message content | M |

1620

| Parameter | Size (bits) | Notes | Mandatory/Optional |
|---|---|---|---|
| Length | 11 | Size of Content field | M |
| Group ID | 4 | 2=Vendor Specific Nested IE | M |
| Type | 1 | 1=Payload IE | M |
| Content | Variable | UWB message content | M |

FIG. 17

| Size | Bits: 3 | 2 | 1 | 1 | 1 |
|---|---|---|---|---|---|
| Name | Security Level | Key Identifier Mode | Frame Counter Suppression | ASN in Nonce | Reserved |
| Value | 0b110 | 0b00 | 0b1 | 0b0 | Any |
| Description | ENC-MIC-64 | Implicit key | Shared global frame counter (phyStsIndex) | Frame counter is used to generate the nonce | N/A |

FIG. 18

| Size | Bits: 3 | 1 | 1 | 1 | 1 | 1 | 1 | 1 | 2 | 2 | 2 |
|---|---|---|---|---|---|---|---|---|---|---|---|
| Name | Frame Type | Security Enabled | Frame Pending | AR | PAN ID Compression | Reserved | Sequence Number Suppression | IE Present | Destination Addressing Mode | Frame Version | Source Addressing Mode |
| Value | 0b001 | 0b1 | 0b0 or 0b1 | 0b1 | 0b1 | Any | 0b1 | 0b1 | 0b10 | 0b10 | 0b10 |
| Description | Data frame | MAC sublayer protection | 0b0: No pending data 0b1: More data will be followed | No ACK | Destination PAN ID only | N/A | No sequence number | IEs are contained | Short address | IEEE Std 802.15.4 | Short address |

ELECTRONIC DEVICE FOR PERFORMING RANGING BY USING ULTRA WIDE BAND COMMUNICATION AND OPERATING METHOD THEREOF

CROSS-REFERENCE TO RELATED APPLICATION(S)

This application is a continuation application of prior application Ser. No. 17/166,519, filed on Feb. 3, 2021, which is based on and claims priority under 35 U.S.C. § 119(a) to Korean patent application number 10-2020-0015008, filed on Feb. 7, 2020, in the Korean Intellectual Property Office, the disclosure of which is incorporated by reference herein in its entirety.

BACKGROUND

1. Field

The disclosure relates to an electronic device for performing ranging by using an ultra wide band (UWB) communication scheme and an operating method of the electronic device.

2. Description of Related Art

The Internet has evolved from a human-centered connection network, through which a human generates and consumes information, to an Internet of Things (IoT) network that receives, transmits, and processes information between distributed elements such as objects. Internet of Everything (IoE) technology is emerging, in which a technology related to the IoT is combined with, for example, a technology for processing big data through connection with a cloud server. In order to implement the IoT, various technical components are required, such as sensing techniques, wired/wireless communication and network infrastructures, service interface techniques, security techniques, etc. In recent years, techniques including a sensor network for connecting objects, Machine-to-Machine (M2M) communication, Machine Type Communication (MTC), etc., have been studied.

In the IoT environment, intelligent Internet Technology services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

As it is possible to provide various services according to the development of wireless communication systems, there is a need for a method of efficiently providing these services. For example, in medium access control (MAC), a ranging technique that measures distances between electronic devices by using ultra wide band (UWB) may be used. UWB is a wireless communication technology that uses a very wide frequency band of several GHz or more in a baseband, instead of using a radio carrier.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for performing ranging with at least one electronic device by using an ultra wide band (UWB) communication scheme, and a method of recovering from a ranging failure more quickly and adjusting a ranging period differently for each device.

Additional aspects will be set forth in part in the description which follows and, in part, will be apparent from the description, or may be learned by practice of the presented embodiments.

In accordance with an aspect of the disclosure, an operating method of a first electronic device for performing ranging by using ultra wide band (UWB) communication, is provided. The operating method includes transmitting a ranging control message (RCM) including block striding information to a second electronic device, determining whether to perform hopping based on a result of transmitting the ranging control message, determining a hopping round value based on a result of determining whether to perform the hopping and the block striding information, and performing ranging with the second electronic device based on the block striding information and the hopping round value.

In accordance with another aspect of the disclosure, an operating method of a second electronic device for performing ranging by using UWB communication, is provided. The operating method includes determining whether to perform hopping based on a result of receiving a first ranging control message from a first electronic device, determining a hopping round value based on a result of determining whether to perform the hopping, receiving a second ranging control message from the first electronic device based on the hopping round value, and performing ranging with the first electronic device based on block striding information included in the second ranging control message.

In accordance with another aspect of the disclosure, a first electronic device for performing ranging by using UWB communication, is provided. The first electronic device includes a communicator, a memory, and at least one processor configured to execute a program stored in the memory to control an operation of the first electronic device to transmit a ranging control message including block striding information to a second electronic device through the communicator, determine whether to perform hopping based on a result of transmitting the ranging control message, determine a hopping round value based on a result of determining whether to perform the hopping and the block striding information, and perform ranging with the second electronic device based on the block striding information and the hopping round value.

In accordance with another aspect of the disclosure, a second electronic device for performing ranging by using UWB communication, is provided. The second electronic device includes a communicator, a memory, and at least one processor configured to execute a program stored in the memory to control an operation of the second electronic device to determine whether to perform hopping based on a result of receiving a first ranging control message from a first electronic device, determine a hopping round value based on a result of determining whether to perform the hopping, receive a second ranging control message from the first electronic device through the communicator based on the hopping round value, and perform ranging with the first electronic device based on block striding information included in the second ranging control message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates a structure of a payload information element (IE) including block striding information according to an embodiment of the disclosure;

FIG. 11 illustrates a structure of a payload IE including block striding information according to an embodiment of the disclosure;

FIG. 15 illustrates an example of a structure of a medium access control (MAC) frame according to an embodiment of the disclosure;

FIG. 16 illustrates parameters included in a header IE and a payload IE according to an embodiment of the disclosure;

FIG. 17 illustrates a frame control field of an MAC frame according to an embodiment of the disclosure;

FIG. 18 illustrates an auxiliary security header field of an MAC frame according to an embodiment of the disclosure;

Throughout the drawings, like reference numerals will be understood to refer to like parts, components, and structures.

DETAILED DESCRIPTION

Figure 1:
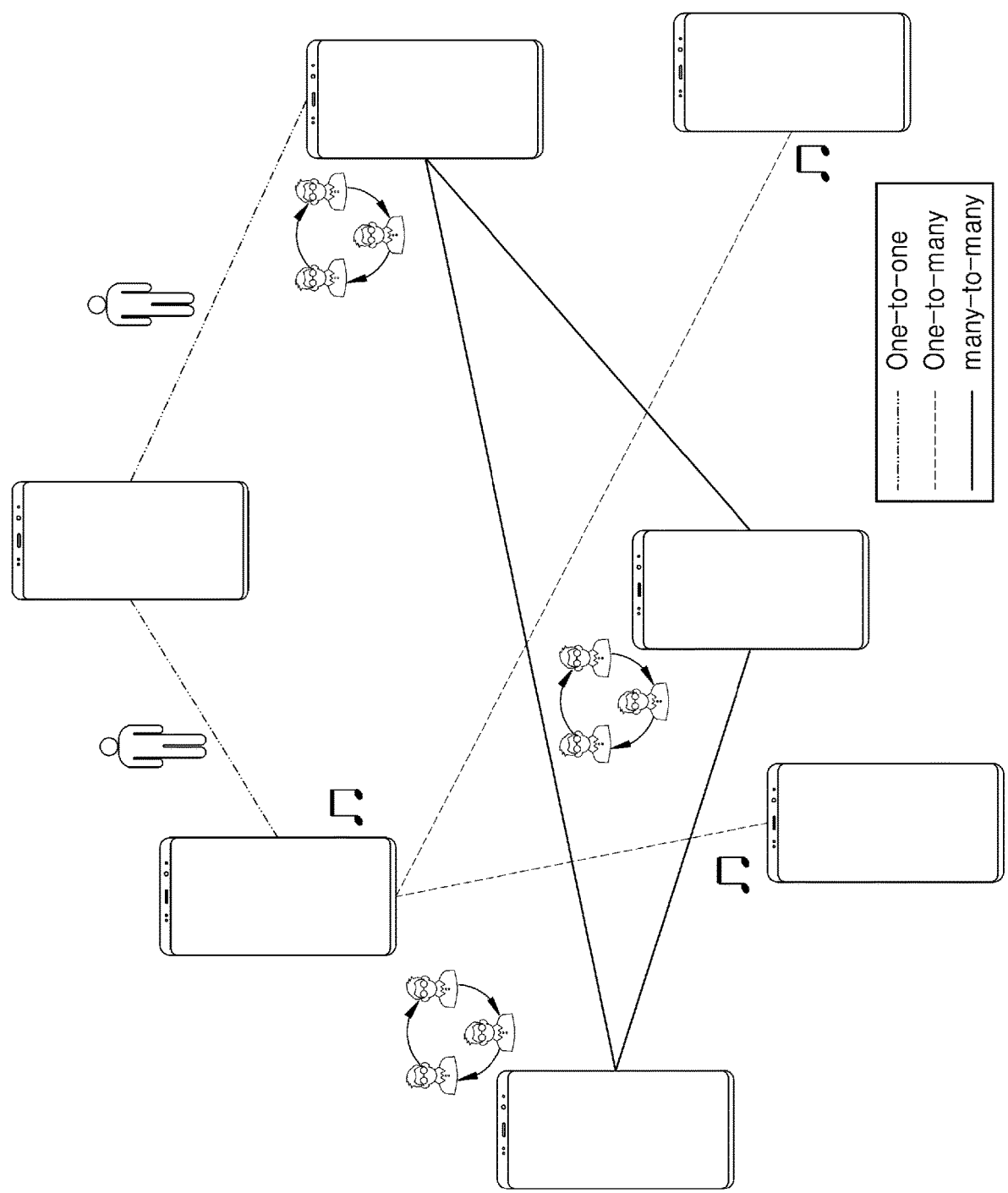
FIG. 1 is a diagram for describing a general Device-to-Device (D2D) communication procedure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Also, it will be understood that although the terms "first," "second," etc. may be used herein to describe various elements, these elements should not be limited by these terms. These terms are only used to distinguish one component from another.

Also, the terms used herein are for the purpose of describing particular embodiments of the disclosure and are not intended to limit the scope of the disclosure. As used herein, the singular forms "a," "an," and "the" are intended to include the plural forms as well, unless the context clearly indicates otherwise. Also, it will be understood that when a region is referred to as being "connected to" or "coupled to" another region, it may be "directly connected or coupled to" the other region or "electrically connected to" the other region. It will be understood that terms such as "comprise," "include," and "have," when used herein, specify the presence of stated elements, but do not preclude the presence or addition of one or more other elements.

The use of the term "the" and a similar definite term in the specification is to be construed to cover both the singular and the plural. Also, operations of all methods described herein may be performed in any suitable order unless otherwise clearly indicated herein. The disclosure is not limited to the order of the described operations.

The phrase "in an embodiment of the disclosure" appearing in various places in the specification does not necessarily refer to the same embodiment of the disclosure.

An embodiment of the disclosure may be represented by functional block configurations and various processing operations. All or part of such functional blocks may be implemented by any number of hardware and/or software components configured to perform particular functions. For example, the functional blocks of the disclosure may be implemented as one or more microprocessors or may be implemented as circuit configurations for certain functions. Also, for example, the functional blocks of the disclosure may be implemented with various programming or scripting languages. The functional blocks may be implemented as algorithms that are executed on one or more processors. Also, the disclosure may employ any techniques for electronic environment configuration, signal processing, and/or data processing.

Also, the connecting lines or connecting members illustrated in the drawings are intended to represent functional connections and physical or logical connections between elements. In a real device, connections between elements may be represented by various functional connections, physical connections, or circuit connections that are replaceable or added.

In general, wireless sensor network technologies are largely classified into wireless local area network (WLAN) technologies and wireless personal area network (WPAN) technologies according to recognition distance. WLAN is a technology based on IEEE 802.11 and is a technology that allows a connection to a backbone network within a radius of about 100 m. WPAN is a technology based on IEEE 802.15 and includes Bluetooth, ZigBee, and ultra wide band (UWB). A wireless network in which such a wireless network technology is implemented may include a plurality of communication electronic devices. The communication electronic devices perform communication in an active period by using a single channel. That is, the communication electronic devices may collect packets and transmit the collected packets in the active period.

UWB may refer to a short-range high-speed wireless communication technology using a wide frequency band of several GHz or more in a baseband state, a low spectral density, and a short pulse width (1-4 nsec). UWB may refer to the band itself to which UWB communication is applied. Hereinafter, a method of ranging between electronic devices will be described based on a UWB communication scheme, but this is only an example. In practice, various wireless communication technologies may be used.

Electronic devices according to embodiments of the disclosure may include a fixed terminal or a mobile terminal implemented as a computer device and may communicate with other devices and/or servers by using a wireless or wired communication scheme. For example, the electronic devices may include smart phones, mobile terminals, laptop computers, digital broadcasting terminals, personal digital assistants (PDAs), portable multimedia players (PMPs), navigations, slate personal computers (PCs), tablet PCs, desktop computers, digital televisions (TVs), refrigerators, artificial intelligence speakers, wearable devices, projectors, smart keys, smart cars, printers, etc., but are not limited to these examples.

Hereinafter, the disclosure will be described in detail with reference to the accompanying drawings.

FIG. 1 is a diagram for describing a general Device-to-Device (D2D) communication procedure according to an embodiment of the disclosure.

D2D communication refers to a communication scheme in which electronic devices located geographically close to each other directly communicate with each other, without passing through infrastructures such as base stations.

Referring to FIG. 1, electronic devices may perform one-to-one communication, one-to-many communication, or many-to-many communication. D2D communication may use an unlicensed frequency band such as Wi-Fi Direct and Bluetooth. Alternatively, D2D communication may improve the frequency utilization efficiency of a cellular system by using a licensed frequency band. D2D communication may be used restrictively as a term referring to Machine-to-Machine (M2M) communication, but D2D communication in the disclosure may include not only communication between simple electronic devices each having a communication function but also communication between various types of electronic devices each having a communication function, such as smart phones or PCs.

Figure 2:
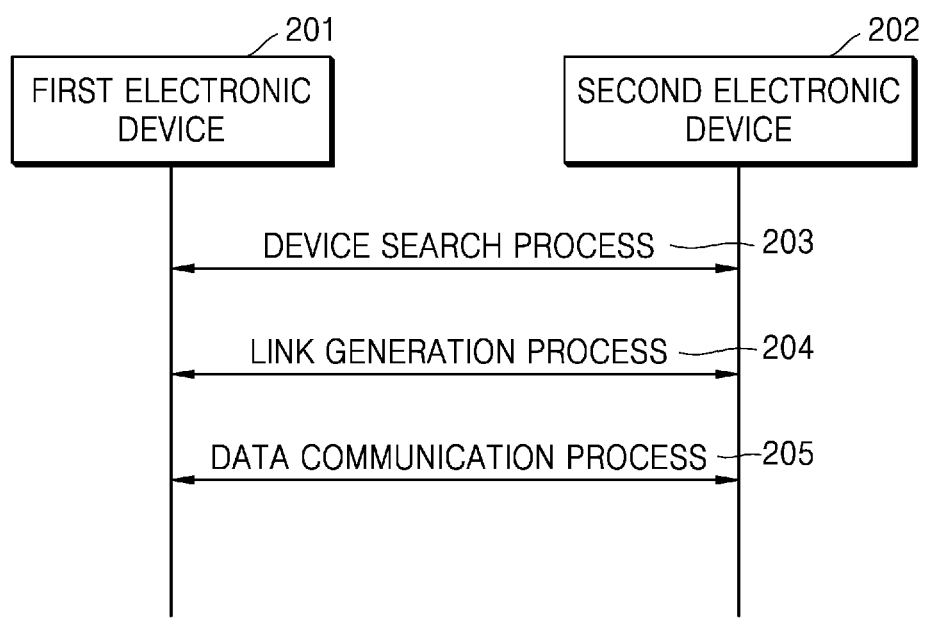
FIG. 2 is a diagram illustrating a communication process of a plurality of electronic devices according to an embodiment of the disclosure.

FIG. 2 is a diagram illustrating a communication process of a plurality of electronic devices according to an embodiment of the disclosure.

A first electronic device 201 and a second electronic device 202 may perform communication through a device search process 203, a link generation process 204, and a data communication process 205.

In the device search process 203, the first electronic device 201 and the second electronic device 202 may each search for other electronic devices capable of performing D2D communication among electronic devices located around the first electronic device 201 and the second electronic device 202. In this manner, the first electronic device 201 and the second electronic device 202 may each determine whether to generate a link for D2D communication. For example, the first electronic device 201 may transmit a search signal to allow the second electronic device 202 to search for the first electronic device 201. Also, the first electronic device 201 may receive a search signal transmitted by the second electronic device 202 and confirm that other electronic devices capable of performing D2D communication are within a D2D communication range.

In the link generation process 204, the first electronic device 201 and the second electronic device 202 may each generate a link for data transmission with an electronic device to transmit data among electronic devices found in the device search process 203. For example, the first electronic device 201 may generate a link for data transmission with the second electronic device 202 found in the device search process 203.

In the data communication process 205, the first electronic device 201 and the second electronic device 202 may each transmit and receive data to and from the devices that generate the link in the link generation process 204. For example, the first electronic device 201 may transmit and receive data to and from the second electronic device 202 through the link generated in the link generation process 204.

Various embodiments of the disclosure relate to medium access control (MAC) based on the D2D communication described above, and it is necessary to measure distances between electronic devices for the MAC. A UWB ranging technique may be used to measure the distances between the electronic devices. For example, when a digital key stored in a smart phone is used to open or close a vehicle door, a vehicle may measure a distance between the smart phone and the vehicle by using a plurality of UWB communication modules (e.g., six UWB communication modules) and estimate the location of the smart phone based on a result of the measuring. When the distance between the vehicle and the smart phone is within a certain distance, the vehicle may automatically open the vehicle door, thereby increasing user convenience. The vehicle and the smart phone may use multicast ranging or broadcast ranging.

The electronic device according to the embodiment of the disclosure may perform ranging by using a ranging control frame. Two device types related to ranging control may be referred to as a "controller" or a "controlee."

A controller 100 may be defined as a device that defines and controls ranging parameters by transmitting a ranging control frame together with a ranging control IE. The ranging control frame is used to set lane parameters used for ranging. In the disclosure, "ranging control frame" and "ranging control message" may be used as the same meaning.

A controlee 200 may be defined as a device that uses ranging parameters received from the controller. At least one controlee may be managed by the controller. A method of determining the role of the device (e.g., the role of the controller or the role of the controlee) and selecting ranging parameters may be variously implemented.

Also, two device types for ranging control may be referred to as an "initiator" or a "responder." The initiator is a device that starts ranging by transmitting a poll. The responder is a device that responds to the poll received from the initiator.

The controller according to the embodiment of the disclosure may determine devices participating in ranging and device types by using a ranging Initiator/responder list (IRL) IE or a ranging scheduling (RS) IE. The IRL IE and the RS IE may be carried by the ranging control frame. In scheduling-based ranging, the RS IE may be configured by the controller 100 so as to indicate resource management and the roles of devices (i.e., the role of the initiator or the responder). In contention-based ranging, when the RS IE is not used, the IRL IE may be used to determine the roles of devices.

A schedule mode field of the ranging control IE indicates whether the ranging frame is transmitted by using contention or is transmitted by using a schedule. Devices that are not specified by these IEs are unable to participate in ranging. When transmission of a poll frame by a device is required, the device type of the corresponding device may be determined as an initiator, and a device responding to the poll frame may be determined as a responder.

In the case of contention-based multicast/broadcast ranging, when the controller is the only initiator in ranging and a destination address field in an MAC header of a ranging control frame designates the responder, the controller may not add the IRL IE to the ranging control frame.

Because the ranging control frame includes the IRL IE or the RS IE, the controlee may know whether to transmit the poll by receiving the ranging control frame. When the device type of the controlee is designated as the initiator in the IRL IE or the RS IE, the controlee may transmit the poll frame. Both the controller and the controlee may become the initiator or the responder.

Figure 3:
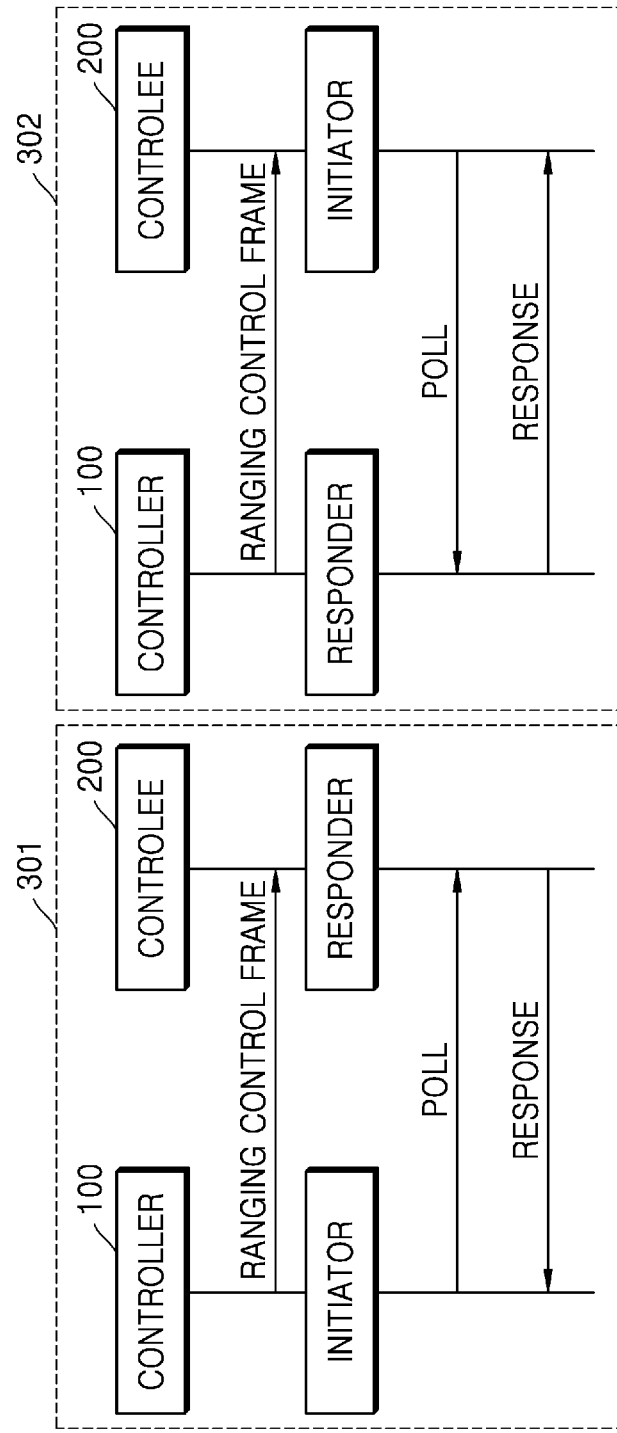
FIG. 3 illustrates an example of single-sided two-way ranging (SS-TWR) using a ranging control frame according to an embodiment of the disclosure.

FIG. 3 illustrates an example of single-sided two-way ranging (SS-TWR) using a ranging control frame according to an embodiment of the disclosure.

Referring to FIG. 3, flow diagram 301 illustrates that, when the controller 100 sets the controller 100 to transmit a poll frame, the controller 100 may become an initiator and transmit the poll frame. In contrast, as illustrated in flow diagram 302 of FIG. 3, when the controller 100 sets the controlee 200 to transmit a poll frame, the controlee 200 may become an initiator and transmit the poll frame.

Also, the ranging control frame may include a ranging acknowledgment IE indicating a ranging response type. A plurality of controlees may be used for multicast/broadcast/many-to-many (M2M) ranging.

The device according to the embodiment of the disclosure may perform ranging in units of ranging blocks.

The ranging block refers to a period for ranging. The ranging block includes a plurality of ranging rounds. The ranging round represents a period required to complete one complete range measurement cycle between a pair of ranging devices participating in a ranging exchange. The ranging round includes a plurality of ranging slots. The ranging slot represents a period for transmitting one ranging frame.

Figure 4:
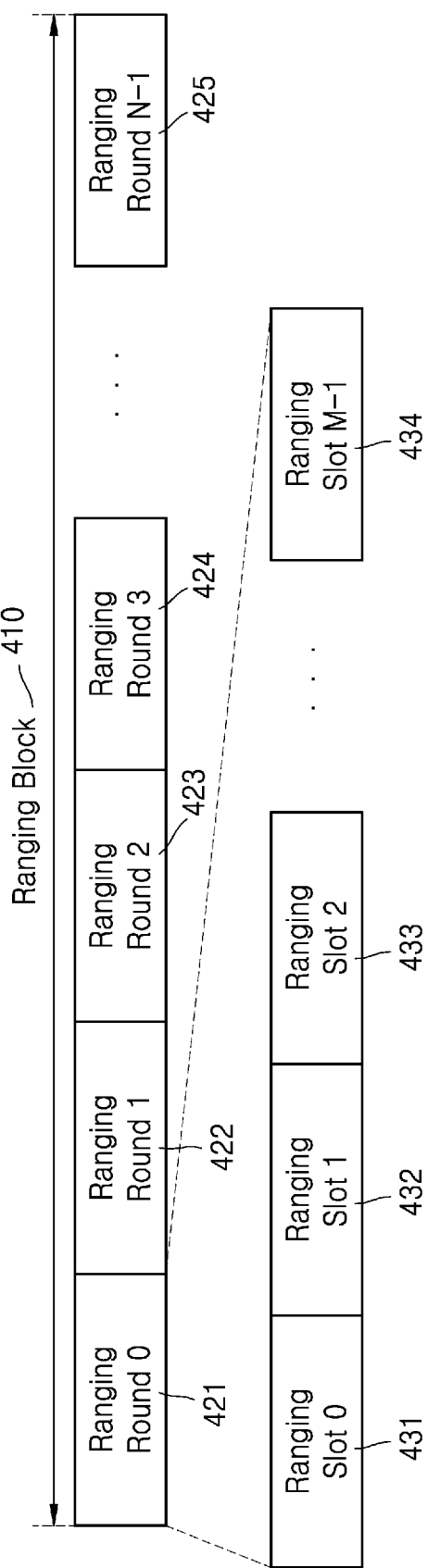
FIG. 4 illustrates a ranging block structure according to an embodiment of the disclosure.

FIG. 4 illustrates a ranging block structure according to an embodiment of the disclosure.

Referring to FIG. 4, a ranging block 410 may include N ranging rounds 421, 422, 423, 424, and 425. In the ranging block, a first ranging round 421 may include M ranging slots 431, 432, 433, and 434.

According to various embodiments of the disclosure, two types of ranging modes (e.g., an interval base mode and a block base mode) may be used for access control. The block base mode uses a strict time structure, but the interval base mode does not use a strict time structure. The controller 100 may select one of the modes and specify the corresponding mode by using a time structure indicator of a ranging control IE.

The block base mode uses a ranging block structure that uses a timeline set at a certain period.

In the block base mode, the ranging block structure may be determined based on a ranging block duration field, a ranging round duration field, and a ranging slot duration field, which are included in information about ranging control. According to an embodiment of the disclosure, the information about the ranging control may be an advanced ranging control IE.

When the device receives a ranging control message (RCM), the device may set related timeline for ranging and the structure of the ranging block by using the field values of the ranging control IE included in the RCM. Also, according to another embodiment of the disclosure, a ranging block structure may be set by a next upper layer.

The controller may repeatedly transmit the ranging block structure through all RCMs. When the ranging block structure needs to be changed or updated, the controller may transmit a ranging block update (RBU) IE including a field related to a ranging block update.

Also, an index value of each ranging round in the ranging block may be set to increase sequentially based on the first ranging round in the ranging block. Referring to FIG. 4, when the N ranging rounds 421, 422, 423, 424, and 425 are included in the ranging block 410, the index value of the first ranging round 421 of the ranging block 410 may be 0 and the index value of the last ranging round of the ranging block 410 may be N−1.

Figure 5:
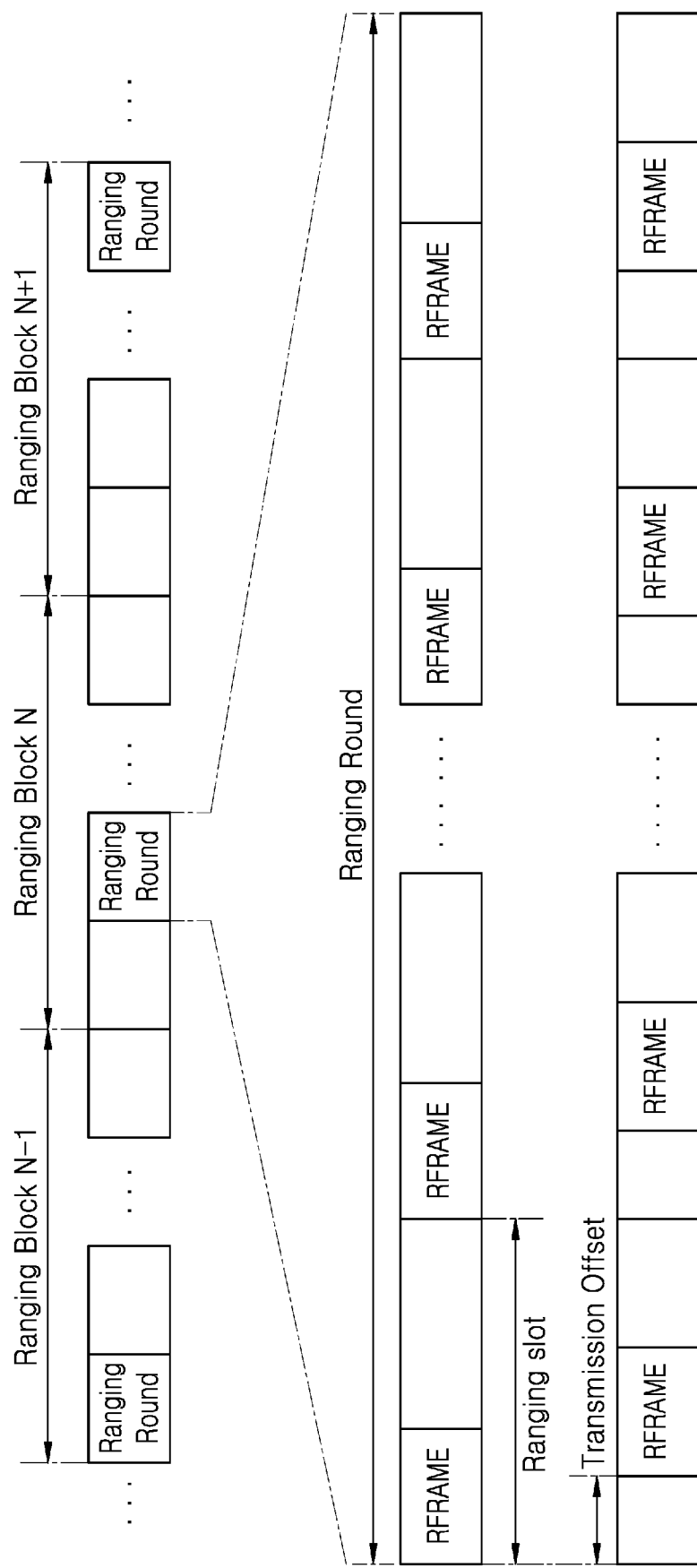
FIG. 5 illustrates a timing diagram for a block base mode according to an embodiment of the disclosure.

Also, referring to FIGS. 4 and 5, the index value of each ranging slot in the ranging round may be set to increase sequentially based on the first ranging slot in the ranging round. In this case, for example, when the M ranging slots 431, 432, 433, and 434 are included in the first ranging round 421, the index value of a first ranging slot 431 of the first ranging round 421 may be 0 and the index value of a last ranging slot 434 of the first ranging round 421 may be M−1.

FIG. 5 illustrates a timing diagram for a block base mode according to an embodiment of the disclosure.

Referring to FIG. 5, an index value of each ranging block may be set to increase sequentially based on the first ranging block. In this case, for example, the index value of the first ranging block may be N−1 and the index value of each ranging block may be set to increase by one.

FIG. 5 illustrates a plurality of ranging rounds included in a ranging block N having an index value of N. Each ranging round may include a plurality of ranging slots. A ranging frame may be transmitted in the ranging slot. Also, a transmission offset may be set to the ranging frame and the ranging frame may be transmitted in the ranging slot. The ranging frame refers to a frame transmitted and received between devices so as to perform ranging. For example, the ranging frame may be a frame including a ranging marker that is information for defining a reference point of time.

Figure 6:
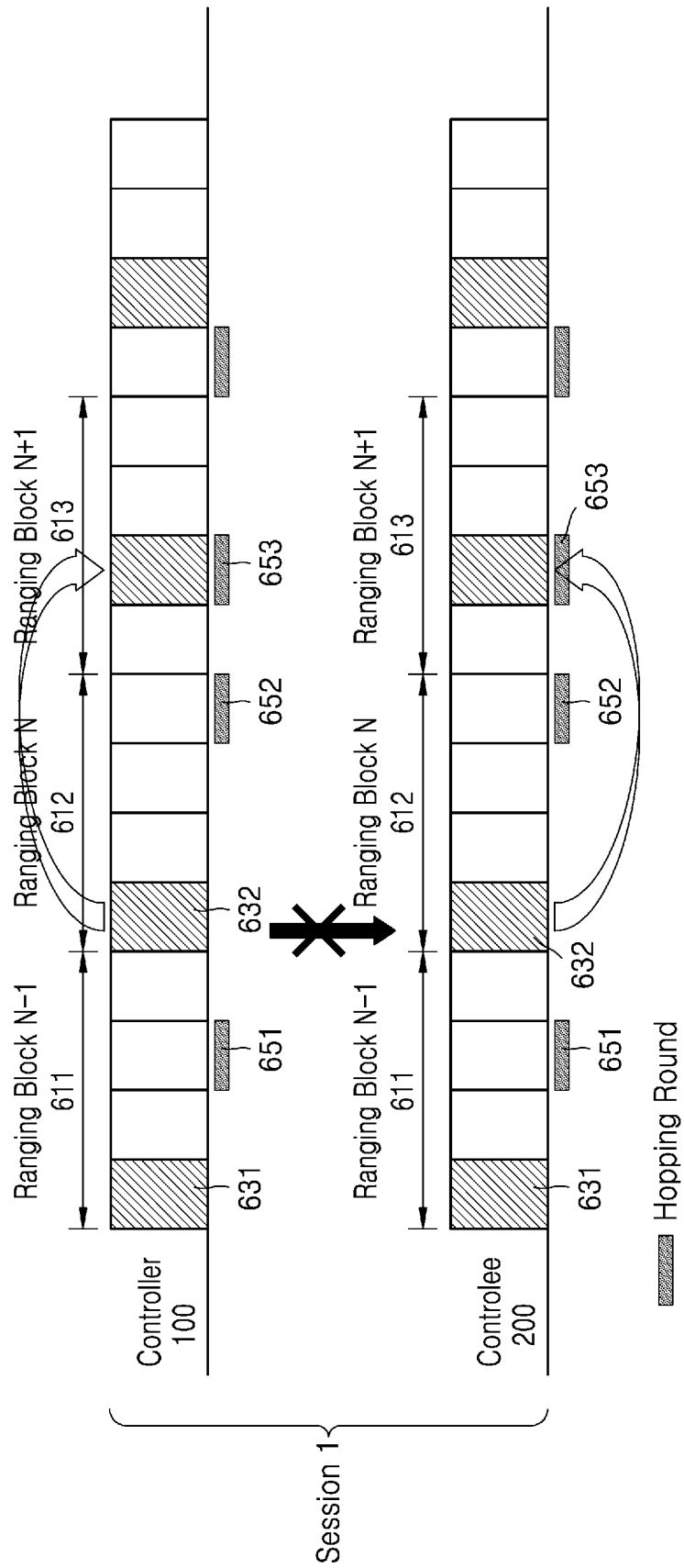
FIG. 6 is a diagram for describing hopping in ranging according to an embodiment of the disclosure.

FIG. 6 is a diagram for describing hopping in ranging according to an embodiment of the disclosure.

Hopping in UWB-based ranging may refer to an operation of, when it is not appropriate to perform ranging in a ranging round being used among devices, performing ranging in another previously appointed ranging round. In this case, for example, each device may previously store a hopping sequence for performing hopping.

According to an embodiment of the disclosure, when the ranging is successful in the ranging round being currently used in the current ranging block, electronic devices participating in ranging may perform ranging in the same ranging round even in the next ranging block. For example, when the electronic devices participating in the ranging are using a ranging round m in a ranging block n, the ranging round m may also be used within a ranging block n+1. (In this case, n and m are integers greater than or equal to zero.) However, when the ranging fails in the ranging round being currently used in the current ranging block, the controller 100 may determine to "hop" to another ranging round in the next ranging block. That is, when the ranging fails in the ranging round being currently used, the electronic devices may perform ranging in a hopping round having a different index value within the next ranging block. For example, when the electronic devices participating in the ranging are using a ranging round m in a ranging block n, a ranging round k (k is an integer greater than or equal to 0, k m) may be used in a ranging block n+1. The hopping sequence including the hopping round determined for each block may be determined differently for each session.

Referring to FIG. 6, in a ranging block N−1 611, the controller 100 and the controlee 200 may perform ranging in a ranging round 0 631 having an index value of 0. (In this case, N is a natural number.) The controller 100 may determine that the ranging exchange is performed smoothly and may transmit, to the controlee 200, an RCM in which the value of the hopping mode field is 0.

As illustrated in FIG. 6, when the ranging between the controller 100 and the controlee 200 is successful in the ranging round 0 631 of the ranging block N−1 611, the controller 100 and the controlee 200 may continue to use the ranging round having the same index value in the next ranging block. When the ranging is successful in the ranging round 0 631 of the ranging block N−1 611, the controller 100 and the controlee 200 may perform ranging by using the ranging round 0 632 in which the index value is 0 even in a ranging block N 612.

However, when the ranging fails in the ranging round 0 631 of the ranging block N−1 611, the controller 100 and the controlee 200 may perform hopping in the next ranging block (i.e., the ranging block N 612) and determine to perform ranging in another ranging round. When the ranging fails in the ranging round 0 631 of the current ranging block N−1 611, the controller 100 may perform ranging by hopping to the ranging round 3 (i.e., hopping round 652) in which the index value is 3 in the next ranging block (i.e., the ranging block N 612).

As illustrated in FIG. 6, hopping rounds 651, 652, and 653 may be determined differently for each ranging. Therefore, the hopping round may refer to a ranging round corresponding to a hopping round value determined based on the index value of the ranging block.

As illustrated in FIG. 6, when the ranging between the controller 100 and the controlee 200 is successful in the ranging round 0 631 of the ranging block N−1 611, the controller 100 and the controlee 200 may continue to use the ranging round 0 632 having the same index value of 0 even in the next ranging block (i.e., the ranging block N 612). In this case, the controller 100 may determine that the ranging exchange is performed smoothly and may transmit, to the controlee 200, an RCM in which the value of the hopping mode field is 0.

However, as illustrated in FIG. 6, when the ranging message is not completely transmitted in ranging round 0 632 of the ranging block N 612, the controller 100 and the controlee 200 may perform hopping and determine to perform ranging in another ranging round. The controller 100 may determine that the ranging exchange is not performed smoothly and may transmit, to the controlee 200, an RCM in which the value of the hopping mode field is 1.

When the ranging fails in the ranging round 0 632 of the ranging block N 612, the controller 100 and the controlee 200 may perform hopping in the next ranging block (i.e., ranging block N+1 613) and determine to perform ranging in another ranging round. When the ranging fails in the ranging round 0 632 of the current ranging block N 612, the controller 100 may perform ranging by hopping to the ranging round 1 (i.e., hopping round 653) in which the index value is 1 in the next ranging block (i.e., the ranging block N+1 613).

The controller 100 and the controlee 200 may determine a hopping round among a plurality of ranging rounds included in the ranging block N+1 613. Determining the hopping round may mean changing an index value of a ranging round, which is used for ranging among a plurality of ranging rounds included in the ranging block, from a first value being currently used to a second value.

As the ranging period between the electronic devices is shorter, more power is consumed, but rapid ranging is possible. On the other hand, as the ranging period between the electronic devices is longer, the time required for the ranging increases, but less power is consumed. Therefore, in order to select power saving and rapid ranging as needed, the ranging period between the electronic devices may be dynamically changed. However, the block base mode has the following difficulties in dynamically adjusting the ranging period.

Figure 7:
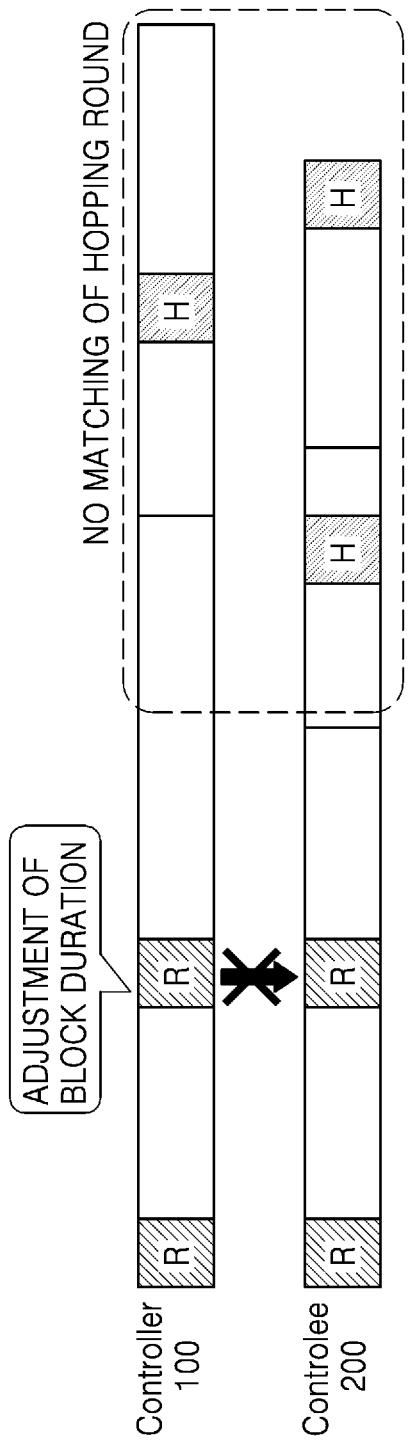
FIG. 7 is a diagram for describing a case in which hopping rounds do not match when a block duration is adjusted according to an embodiment of the disclosure.

FIG. 7 is a diagram for describing the difficulty caused by the mismatching of the hopping round when the block duration is changed according to an embodiment of the disclosure.

Referring to FIG. 7, the controller 100 may change the block duration so as to dynamically change the ranging period and may transmit, to the controlee 200, a control message including information about the changed block duration. When the controlee 200 changes the block duration based on the received control message, the controller 100 and the controlee 200 may continue to perform ranging based on the changed block duration.

However, when the controlee 200 fails to receive the control message, it is impossible to recover the ranging round matching even when the hopping is performed. When the controlee 200 fails to receive the control message, the controller 100 operates based on the changed ranging block duration, but the controlee 200 operates based on the existing ranging block duration. Therefore, the controller 100 and the controlee 200 operate in units of ranging blocks having different durations and operate based on different number of at least one of ranging rounds and round durations. As the timing of the hopping round is changed, it is expected that it will be impossible to recover from the failure to transmit and receive the RCM between the electronic devices to the hopping mode or it will take a lot of time.

Also, in order to recover from the failure to transmit the RCM, a method in which the controller 100 returns to the existing ranging block duration and retransmits the RCM may be considered. However, the changed ranging block duration may be restored to the existing ranging block duration only when only one controlee (e.g., the controlee 200) is provided. When the controller 100 changes the ranging block duration while performing ranging with a plurality of controlees, a method of restoring the existing ranging block duration may be considered for only one controlee that has failed to receive the RCM. However, when the ranging block duration is restored, the ranging timing does not match between the controller and the remaining controlees that succeed in receiving the RCM and change the ranging block duration.

Therefore, the disclosure proposes a method of changing a ranging period by using block striding so as to recover a ranging failure more quickly.

Figure 8:
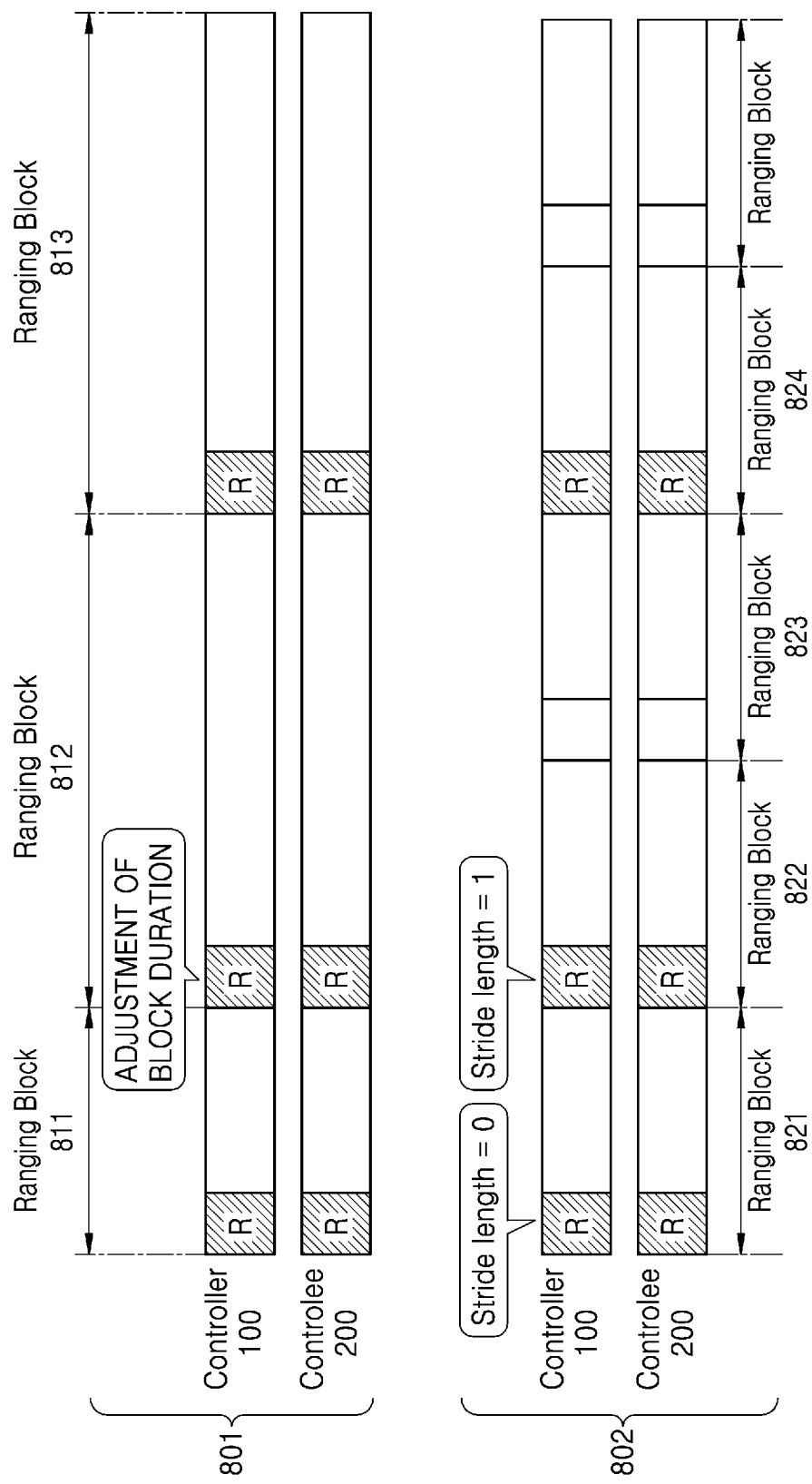
FIG. 8 is a diagram for describing a method of adjusting a ranging period through block striding according to an embodiment of the disclosure.

FIG. 8 is a diagram for describing a method of changing a ranging period through block striding according to an embodiment of the disclosure.

Referring to FIG. 8, a time diagram 801 illustrates a case in which a ranging period is changed by changing an existing block duration. The controller 100 may perform ranging with the controlee 200 by using at least one ranging round among a plurality of ranging rounds included in a ranging block 811. The controller 100 may determine that a block duration change is required, transmit an RCM including block duration change information to the controlee 200, and perform ranging with the controlee 200 by using at least one ranging round among a plurality of ranging rounds included in a ranging block 812 having a changed block duration. The controller 100 may also perform ranging in a ranging block 813 based on the changed block duration.

A time diagram 802 of FIG. 8 illustrates a case in which a ranging period is adjusted through block striding, according to an embodiment of the disclosure. The controller 100 may perform ranging with the controlee 200 by using at least one ranging round among a plurality of ranging rounds included in a ranging block 821. In the ranging block 821, the controller 100 may transmit, to the controlee 200, an RCM for setting a stride length to 0, without performing block striding. Because the block striding is not performed, the controller 100 may perform ranging in a ranging block 822 immediately after the ranging block 821.

In the ranging block 822, the controller 100 may determine that block striding is required, and transmit an RCM including block stride length information to the controlee 200. Referring to FIG. 8, the controller 100 may transmit, to the controlee 200, an RCM for setting a stride length to 1. Because the block stride length is set to 1, the controller 100 and the controlee 200 may skip one ranging block (e.g., ranging block 823) and perform ranging in a next ranging block 824.

Figure 9:
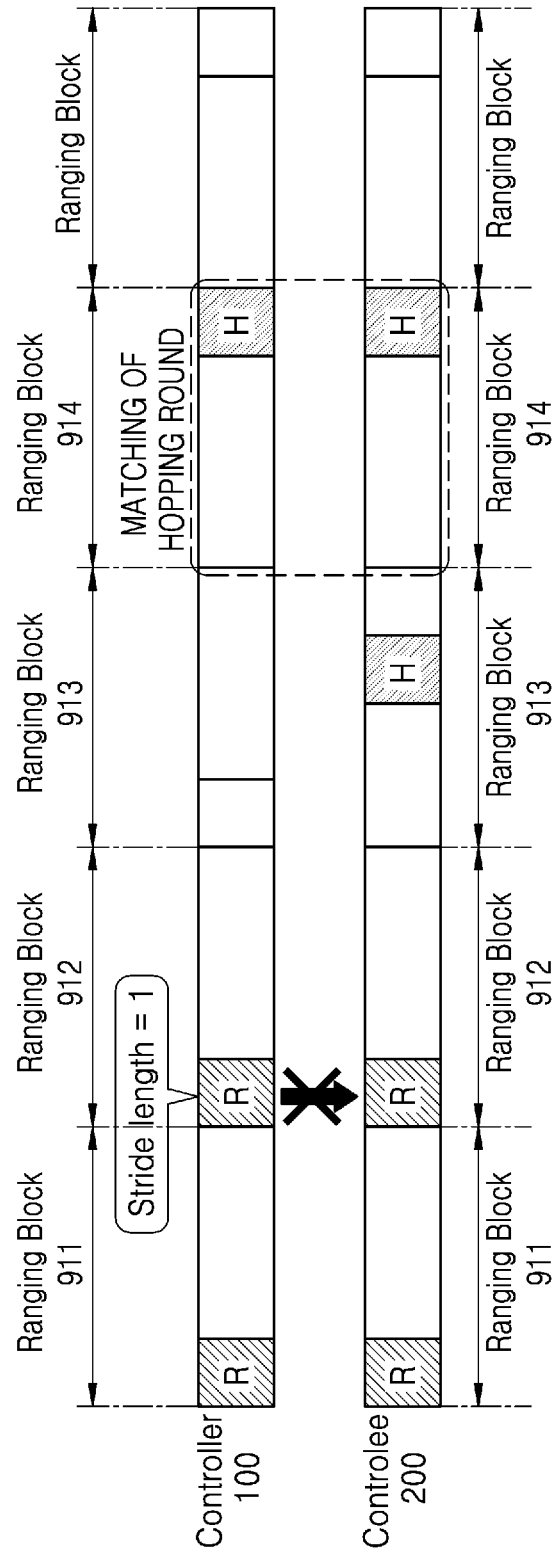
FIG. 9 is a diagram for describing a method of performing hopping when transmitting of a ranging control message including block striding information has failed according to an embodiment of the disclosure.

FIG. 9 is a diagram for describing a method of performing hopping when transmitting of an RCM including block striding information has failed according to an embodiment of the disclosure.

The controller 100 may perform ranging with the controlee 200 by using at least one ranging round among a plurality of ranging rounds included in a ranging block 911. In a ranging block 912, the controller 100 may determine that block striding is required, and transmit an RCM including block stride length information to the controlee 200. For example, in the ranging block 912 of FIG. 8, the controller 100 may transmit, to the controlee 200, an RCM for setting a stride length to 1.

Referring to FIG. 9, the controlee 200 may fail to receive a control message in the ranging block 912. In this case, the controlee 200 may perform hopping and determine to perform ranging in another ranging round. Because the controlee 200 failed to receive the RCM requesting the block striding in the ranging block 912, the controlee 200 may wake up in ranging block 913 immediately after the ranging block 912 and wait for the reception of the RCM. In this case, because the controlee 200 failed to receive the ranging message in the ranging block 912, the controlee 200 may wake up in the hopping round of the ranging block 913 and wait for the reception of the RCM. When the ranging is performed with one controlee, the controller 100 according to an embodiment of the disclosure fails to transmit the RCM requesting block striding in the ranging block 912. Therefore, the controller 100 may not perform the block striding, but may wake up in the ranging block 913 immediately after the ranging block 912 and retransmit the RCM. However, when the ranging is performed with a plurality of controlees, the controller 100 according to an embodiment of the disclosure has to perform the block striding so as to match the ranging timing with the remaining controlees that succeed in receiving the RCM even when some controlees fail to receive the RCM. Therefore, the controller 100 according to an embodiment of the disclosure may determine whether all the controlees communicating with the controller 100 fail to receive the RCM. When all the controlees including the controlee 200 fail to receive the RCM including block stride length information, the controller 100 according to an embodiment of the disclosure may not perform block striding. The controller 100 according to an embodiment of the disclosure may wake up in the hopping round of the very next ranging block and retransmit the RCM. On the other hand, when all the controlees do not fail to receive the RCM (that is, when at least one controlee except for the controlee 200 succeeds in receiving the RCM), the controller 100 according to an embodiment of the disclosure may need to perform the block striding. FIG. 9 illustrates a case in which the controlee 200 fails to receive the RCM in the ranging block 912 and at least one controlee except for the controlee 200 succeeds in receiving the RCM. Referring to the RCM transmitted in the ranging block 912, because the controller 100 is configured to skip one ranging block (e.g., ranging block 913), the controller 100 does not perform a ranging operation, such as an operation of transmitting an RCM, in the ranging block 913 (that is, the striding of the ranging block 913 is performed). Therefore, because the controller 100 does not transmit the RCM in the ranging block 913, the controlee 200 also fails to receive the RCM in the ranging block 913 as well as the ranging block 912.

When the controlee 200 fails to receive the control message in the ranging block 913, the controlee 200 may perform hopping again and determine to perform ranging in another ranging round. The controlee 200 may wake up in a ranging block 914 immediately after the ranging block 913 and wait for the reception of the RCM.

Because the controller 100 determines that the block stride length in the ranging block 912 is 1, the controller 100 may skip one ranging block (e.g., ranging block 913) and perform ranging in the next ranging block (e.g., the ranging block 914). Also, because the controller 100 fails to transmit the RCM in the ranging block 912, the controller 100 may determine to perform hopping. The controller 100 may wake up in the hopping round of the ranging block 914 determined based on the block stride length and transmit an RCM to the controlee 200.

Therefore, the controller 100 and the controlee 200 according to the embodiment of the disclosure may dynamically adjust the ranging period by using the block striding even when the block duration is not changed. Therefore, because the block duration does not change even when the ranging period is changed, the changed ranging period does not affect the hopping round. Also, even when the ranging period is changed, it is unnecessary to newly calculate the hopping round for each block. Therefore, according to an embodiment of the disclosure, even when ranging fails, the recovery of the ranging timing due to the hopping is quick.

FIG. 10 illustrates a structure of a payload IE including block striding information according to an embodiment of the disclosure.

The controller 100 according to an embodiment of the disclosure may transmit block striding information to the controlee 200 by using a content field of a payload IE of an RCM. For example, the controller 100 may transmit an MAC frame of a structure illustrated in FIG. 15 to the controlee 200 as an RCM. According to the payload IE of the structure illustrated in FIG. 10, the same stride length may be applied to all controlees that perform ranging with the controller 100.

Referring to FIG. 10, a table 1010 illustrates that the content field of the payload IE may include information about a UWB message ID, a stride length, a ranging device management list length, and a ranging device management list.

The UWB message ID field may indicate type information of a UWB message. For example, the UWB message ID having a value of 0x11 may indicate that the corresponding message is control message type 1 associated with ranging control.

The stride length field may indicate the number of blocks to be skipped. The stride length field may have a size of 1 byte or 2 bytes. For example, when the value of the stride length field is 0, it may indicate that block striding is not performed.

For example, when the size of the stride length field is 1 byte, $2^8-1=255$. Therefore, up to 255 blocks may be skipped. When 255 blocks are skipped, the ranging interval may be about 256*100 ms. Therefore, it may take about 25.6 seconds for devices to perform ranging once. As another example, when the size of the stride length field is 2 bytes, $2^{16}-1=65,535$. Therefore, up to 65,535 blocks may be skipped. When 65,535 blocks are skipped, the ranging interval may be about 65,536*100 ms. Therefore, it may take about 109.2 minutes for devices to perform ranging once.

The ranging device management list length field indicates the number of elements in the ranging device management list field. Each of the elements in the ranging device management list field may include parameters as illustrated in a table 1020.

The ranging device management list field may include a list of a ranging role, a ranging slot index, and an address for ranging devices.

The ranging role field may indicate whether the role of the selected ranging device is an initiator or a responder. For example, when the value of the ranging role field is 1, the ranging role field may indicate that the role of the corresponding ranging device is an initiator. When the value of the ranging role field is 0, the ranging role field may indicate that the role of the corresponding ranging device is a responder.

The ranging slot index field indicates a slot index assigned to a device identified by the address field. The address field indicates each device participating in ranging.

When a payload IE of a structure illustrated in FIG. 10 is used, the same stride length may be applied to the controlees that perform ranging with the controller 100. On the other hand, when a payload IE of a structure illustrated in FIG. 11 is used, different stride lengths may be applied to the controlees that perform ranging with the controller 100. Because the description of the parameters illustrated in FIG. 10 may be applied to parameters illustrated in FIG. 11, redundant descriptions will be omitted.

FIG. 11 illustrates a structure of a payload IE including block striding information according to an embodiment of the disclosure.

Referring to FIG. 11, a table 1110 illustrates that the content field of the payload IE may include information about a UWB message ID, a ranging device management list length, and a ranging device management list.

The ranging device management list length field indicates the number of elements in the ranging device management list field. Each of the elements in the ranging device management list field may include parameters as illustrated in a table 1120.

The ranging device management list field may include a list of a ranging role, a ranging slot index, a stride length, and an address for ranging devices. Therefore, according to the structure illustrated in FIG. 11, different stride lengths may be applied to the controlees that perform ranging.

Hereinafter, an operating method of each of the controller 100 and the controlee 200, according to an embodiment of the disclosure, will be described in detail. Because ranging is performed between two electronic devices, one of the two electronic devices may be a controller and the other may be a controlee. Therefore, in the following description, the controller 100 may be referred to as a first device, and the controlee 200 may be referred to as a second device. However, the terms "first" and "second" are used to distinguish devices from each other, and the embodiment of the disclosure is not limited to the following description. The controlee 200 may be referred to as a first device, and the controller 100 may be referred to as a second device.

Figure 12:
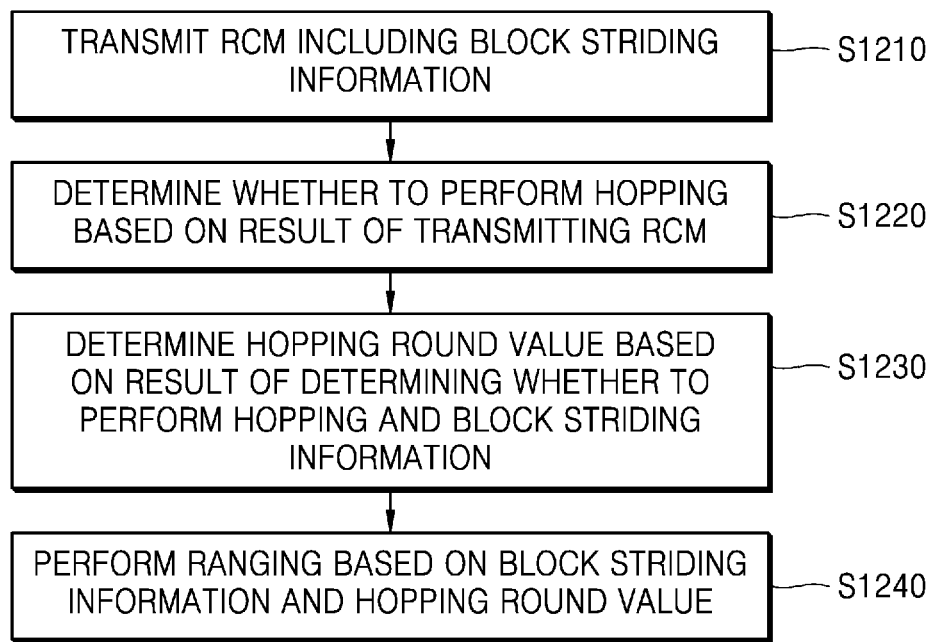
FIG. 12 illustrates a flowchart of an operating method of a first electronic device that performs ranging by using an ultra wide band (UWB) communication according to an embodiment of the disclosure.

FIG. 12 illustrates a flowchart of an operating method of a first electronic device that performs ranging by using UWB communication according to an embodiment of the disclosure.

Referring to FIG. 12, in operation S1210, the first electronic device according to the embodiment of the disclosure may transmit an RCM including block striding information to the second electronic device. The first electronic device may transmit an RCM including block striding information to a plurality of electronic devices including the second electronic device.

The block striding information may include information about the number of blocks to be skipped until next ranging is performed. The first electronic device according to the embodiment of the disclosure may adjust a ranging period by changing the number of blocks to be skipped. Because the RCM including the block striding information has been described with reference to FIGS. 10 and 11, redundant descriptions will be omitted.

In operation S1220, the first electronic device according to the embodiment of the disclosure may determine whether to perform hopping based on a result of transmitting the RCM.

When a message scheduled by the RCM transmitted in operation S1210 is not received for a certain time, the first electronic device according to the embodiment of the disclosure may determine that the transmitting of the RCM failed.

According to an embodiment of the disclosure, the first electronic device may transmit an RCM to a ranging round having a first index value among a plurality of ranging rounds included in a first ranging block. When the message scheduled by the RCM is not received during a certain period in the ranging round having the first index value in the first ranging block, the first electronic device may determine that the transmitting of the RCM failed. The first electronic device may determine to perform hopping based on the determination that the transmitting of the RCM failed. The first electronic device according to an embodiment of the disclosure may determine whether all the electronic devices communicating with the first electronic device for ranging fail to receive the RCM. When all the electronic devices including the second electronic device fail to receive the RCM, the first electronic device may determine not to perform block striding. The first electronic device may not perform block striding and may wake up in the hopping round of the very next ranging block and retransmit the RCM. On the other hand, when all the electronic devices do not fail to receive the RCM (that is, when the second electronic device fails to receive the RCM and at least one electronic device except for the second electronic device succeeds in receiving the RCM), the first electronic device according to an embodiment of the disclosure may determine to perform block striding. When the first electron device determines to perform block striding, the first electronic device may perform operation S1230.

In operation S1230, the first electronic device according to the embodiment of the disclosure may determine a hopping round value based on a result of determining whether to perform the hopping and block striding information.

When the first electronic device determines to perform the hopping, the first electronic device may determine a hopping round value based on the block striding information.

The first electronic device according to the embodiment of the disclosure may determine an index value of a second ranging block to perform next ranging, based on the block striding information. When an index value of a current ranging block is N (N is an integer greater than or equal to 0) and the first electronic device determines to skip n blocks (n is an integer greater than or equal to 0), the first electronic device may determine N+n+1 as the index value of the second ranging block.

The first electronic device may determine a hopping round value based on the index value of the second ranging block. The first electronic device may determine the hopping round value by taking into account a result value of a random number generation function calculated based on the index value of the second ranging block and a hopping key value for a ranging session. When initiating a ranging session with the second electronic device, the first electronic device may share the hopping key with the second electronic device.

In operation S1240, the first electronic device according to the embodiment of the disclosure may perform ranging with the second electronic device based on the block striding information and the hopping round value.

The first electronic device may perform ranging in the second ranging round corresponding to the hopping round value determined in operation S1230 among a plurality of ranging rounds included in the second ranging block determined based on the block striding information. When the first electronic device determines to skip n blocks (n is an integer greater than or equal to 0), the first electronic device may skip next n blocks of the first ranging block and perform the ranging operation in an (n+1)th ranging block. After transmitting the RCM in operation S1210, the first electronic device may perform the ranging operation after 1+n*(block duration).

On the other hand, returning to operation S1220, when the message scheduled by the RCM transmitted in operation S1210 is received within a certain time, the first electronic device according to the embodiment of the disclosure determines that the transmitting of the RCM was successful. When the first electronic device determines that the transmitting of the RCM was successful, the first electronic device may determine not to perform hopping. The first electronic device may determine the index value of the second ranging block to perform ranging, based on the block striding information. Because the first electronic device has determined not to perform hopping, the first electronic device may perform ranging in the ranging round having the first index value, which has been previously used, among a plurality of ranging rounds included in the second ranging block.

Also, the first electronic device according to the embodiment of the disclosure may transmit, to a third device, an RCM including second block striding information that is different from the block striding information for the second electronic device. The first electronic device may perform ranging with the third device based on the second block striding information. For example, the first electronic device may determine to skip n blocks (n is an integer greater than or equal to 0) in the ranging with the second electronic device and may determine to skip m blocks (m is an integer greater than or equal to 0) in the ranging with the third device. In order to apply different stride lengths to devices performing ranging, the payload IE of the structure illustrated in FIG. 11 may be used.

Figure 13:
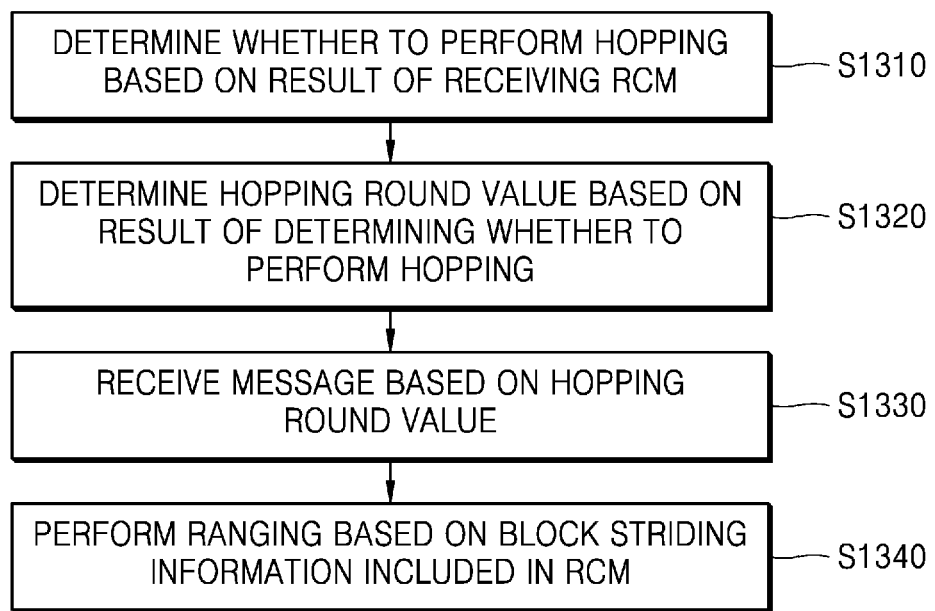
FIG. 13 illustrates a flowchart of an operating method of a second electronic device that performs ranging by using a UWB communication according to an embodiment of the disclosure.

FIG. 13 illustrates a flowchart of an operating method of a second electronic device that performs ranging by using UWB communication according to an embodiment of the disclosure.

Referring to FIG. 13, in operation S1310, the second electronic device according to the embodiment of the disclosure may determine whether to perform hopping based on a result of receiving a first RCM from the first electronic device.

When the first RCM is not received during a certain period in a ranging round having a first index value among a plurality of ranging rounds included in a first ranging block, the second electronic device according to the embodiment of the disclosure may determine that the receiving of the first RCM failed. The second electronic device may determine to perform hopping based on the determination that the receiving of the first RCM failed.

In operation S1320, the second electronic device according to the embodiment of the disclosure may determine a hopping round value based on a result of determining whether to perform hopping.

When the second electronic device determines to perform the hopping, the second electronic device may determine the index value of the second ranging block to perform ranging. The second electronic device may determine a hopping round value based on the index value of the second ranging block.

As an example, when an index value of a current ranging block is N (N is an integer greater than or equal to 0) and a previously negotiated block stride length is 0, the second electronic device may determine N+1 as the index value of the second ranging block. As an example, when the index value of the current ranging block is N and the previously negotiated block stride length is 0, the second electronic device may determine N+n+1 as the index value of the second ranging block.

The second electronic device may determine a hopping round value based on the index value of the second ranging block. The second electronic device may determine the hopping round value by taking into account a result value of a random number generation function calculated based on the index value of the second ranging block and a hopping key value for a ranging session. When initiating a ranging session with the second electronic device, the second electronic device may receive the hopping key from the first electronic device.

When the RCM is not received in the ranging round determined by the hopping, the second electronic device according to the embodiment of the disclosure may repeatedly perform operations S1310 and S1320.

In operation S1330, the second electronic device according to the embodiment of the disclosure may receive a second RCM from the first electronic device based on the hopping round value. The second electronic device may receive the second RCM in the second ranging round corresponding to the hopping round value among the ranging rounds included in the second ranging block.

In operation S1340, the second electronic device according to the embodiment of the disclosure may perform ranging with the first electronic device based on block striding information included in the second RCM.

The block striding information may include information about the number of blocks to be skipped. The second electronic device according to the embodiment of the disclosure may adjust a ranging period by changing the number of blocks to be skipped. Because the RCM including the block striding information has been described with reference to FIGS. 10 and 11, redundant descriptions will be omitted.

The second electronic device may determine the index value of the third ranging block to perform ranging, based on the block striding information. In operation S1330, when the index value of the second ranging block that has received the second RCM is N (N is an integer greater than or equal to 0) and information indicating that the number of blocks to be skipped is n is included in the second RCM, the second electronic device may determine N+n+1 as the index value of the third ranging block.

The second electronic device may perform ranging in the third ranging round corresponding to the hopping round value determined in operation S1320 among a plurality of ranging rounds included in the third ranging block.

Returning to operation S1310, when the first RCM is received in the ranging round having the first index value among the ranging rounds included in the first ranging block, the second electronic device according to the embodiment of the disclosure may determine that receiving of the first RCM was successful and may determine not to perform hopping. The second electronic device may determine the index value of the second ranging block to perform ranging. The second electronic device may perform ranging in the ranging round having the first index value among the ranging rounds included in the second ranging block.

As described above, according to an embodiment of the disclosure, the electronic devices may adjust the ranging period by using block striding, such that recovery using a hopping mode is possible upon ranging failure.

Also, according to the existing method of adjusting the ranging period by changing the ranging block duration, a process of re-matching the ranging timing by restoring the changed ranging block duration to the original block duration when the ranging between the electronic devices failed. However, the method of recovering from the ranging failure by restoring the changed ranging block duration to the original block duration was able to be used only when the controller performs ranging with one controlee. On the other hand, according to an embodiment of the disclosure, even when the controller performs ranging with a plurality of controlees, it is possible to recover from the ranging failure and relatively quick recovery is possible.

Also, when the hopping round for each ranging block is calculated in advance, the hopping round is not affected even when the ranging period is adjusted by using the block striding. Therefore, it is unnecessary to newly calculate the hopping round. Also, the controller according to the embodiment of the disclosure may change the ranging period differently with respect to each controlee.

Figure 14:
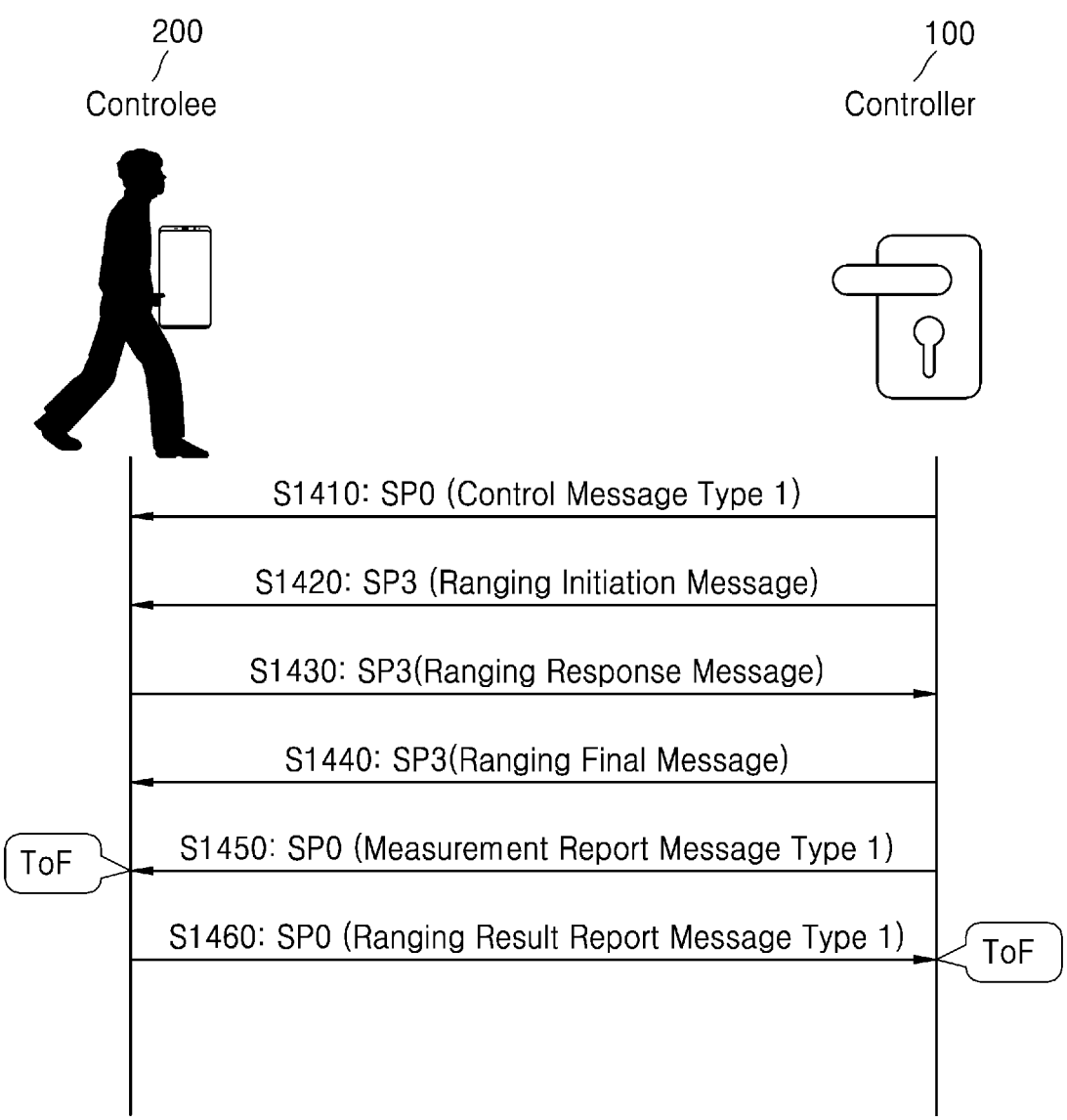
FIG. 14 illustrates a signal flow diagram of a method of performing ranging between a controller and a controlee according to an embodiment of the disclosure.

FIG. 14 illustrates a signal flow diagram of a method of performing ranging according to an embodiment of the disclosure. FIG. 14 illustrates an example in which the controller 100 serves as an initiator.

Referring to FIG. 14, in operation S1410, the controller 100 according to the embodiment of the disclosure may transmit a control message type 1 of an SP0 packet format to the controlee 200. The controller 100 according to the embodiment of the disclosure may transmit a MAC frame of a structure illustrated in FIG. 15 to the controlee 200 as an RCM.

In operation S1420, the controller 100 according to the embodiment of the disclosure may transmit a ranging initiation message of an SP3 packet format to the controlee 200. In operation S1430, the controlee 200 according to the embodiment of the disclosure may transmit a ranging response message of the SP3 packet format to the controller 100. In operation S1440, the controller 100 according to the embodiment of the disclosure may transmit a ranging final message of an SP3 packet format to the controlee 200.

In operation S1450, the controller 100 according to the embodiment of the disclosure may transmit a measurement report message type 1 of the SP0 packet format to the controlee 200. In operation S1460, the controlee 200 according to the embodiment of the disclosure may transmit a ranging result report message type 1 of the SP0 packet format to the controller 100. The measurement report message type 1 may include information about a measurement value (e.g., round-trip time, reply time, etc.) used to calculate time of flight (ToF). The ToF that is calculated by using the received information may be carried in a subsequent ranging result report message type 1.

FIG. 15 illustrates an example of a structure of an MAC frame according to an embodiment of the disclosure.

FIG. 17 illustrates a frame control field of an MAC frame according to an embodiment of the disclosure.

FIG. 18 illustrates an auxiliary security header field of an MAC frame according to an embodiment of the disclosure.

Referring to FIG. 15, the controller 100 according to the embodiment of the disclosure may transmit an MAC frame of a structure illustrated in FIG. 15 to the controlee 200 as an RCM.

Referring to FIG. 17, a frame control field indicates format and setting of the frame. For example, the frame control field may have a format illustrated in FIG. 17.

A sequence number field specifies a sequence identifier for the frame. A destination PAN ID field, when present, is an unsigned integer that specifies the unique PAN ID of the intended recipient of the frame.

A destination address field, when present, has a length specified in a destination addressing mode field of the frame control field and specifies the address of the intended recipient of the frame.

Referring to FIG. 18, a source PAN ID field, when present, specifies the unique PAN ID of the originator of the frame. A source address field, when present, specifies the address of the originator of the frame. An auxiliary security header field specifies information required for security processing. For example, the frame control field may have a format illustrated in FIG. 18.

A vendor specific header IE indicated as header IEs in FIG. 15 is reserved for the use of other protocols and/or data relevant only to certain implementations. A vendor specific nested IE indicated as payload IEs in FIG. 15 is reserved for the use of other protocols and/or data relevant only to certain implementations The vendor specific header IE and the vendor specific nested ID will be described below in more detail with reference to FIG. 16.

FIG. 16 illustrates parameters included in a header IE and a payload IE according to an embodiment of the disclosure.

Referring to FIG. 16, a header IE format according to an embodiment of the disclosure is illustrated in a table 1610. The header IE may include length information, element ID information, type information, and content information.

The length field indicates the size of the content field. The element ID field indicates type information of the element. For example, the element ID having a value of 0 may indicate that the element is a vendor specific header IE. The type field indicates element type information. For example, the type field having a value of 0 may indicate that the element is the header IE. The content field may include information about the content of the UWB message.

The payload IE format according to an embodiment of the disclosure is illustrated in a table 1620. The payload IE may include length information, group ID information, type information, and content information.

The length field indicates the size of the content field. The group ID field indicates type information of the group. For example, the group ID field having a value of 2 may indicate that the group is a vendor specific nested IE. The type field indicates element type information. For example, the type field having a value of 1 may indicate that the element is the payload IE. The content field may include information about the content of the UWB message.

Figure 19:
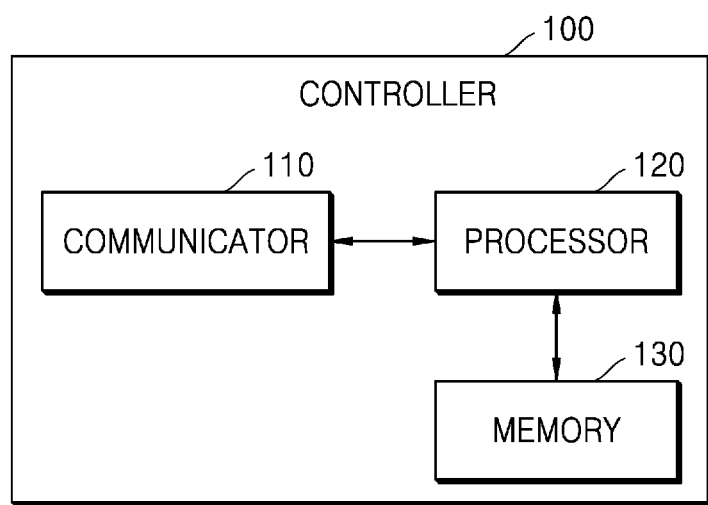
FIG. 19 illustrates a block diagram of a controller according to an embodiment of the disclosure.

FIG. 19 illustrates a block diagram of a controller according to an embodiment of the disclosure.

The controller 100 according to various embodiments of the disclosure may be a fixed terminal or a mobile terminal. The controller 100 may be, for example, at least one of a smart phone, a navigation, a computer, a digital broadcasting terminal, a smart home appliance, an artificial intelligence speaker, a personal digital assistant (PDA), a portable media player (PMP), a smart key, or a wearable device. The controller 100 may communicate with other devices and/or servers through a network by using a wireless or wired communication scheme.

Referring to FIG. 19, the controller 100 according to various embodiments of the disclosure may include a communicator 110, a processor 120, and a memory 130. However, the controller 100 may include more elements or fewer elements than those illustrated in FIG. 19.

In FIG. 19, the controller 100 is illustrated as including one processor, but the embodiment of the disclosure is not limited thereto. The controller 100 may include a plurality of processors. Hereinafter, at least part of the operations and functions of the processor 120 may be performed by a plurality of processors. The controller 100 illustrated in FIG. 19 may perform the operating method of the controller 100 according to various embodiments of the disclosure, and the descriptions of FIGS. 1 to 18 may be applied. Therefore, a description redundant to those provided above will be omitted.

The communicator 110 according to the embodiment of the disclosure may perform wired or wireless communication with other devices and/or networks. To this end, the communicator 110 may include a communication module supporting at least one of various wired and wireless communication methods. For example, the communication module may be in the form of a chipset, or may be a sticker or a bar code including information necessary for communication (e.g., a sticker including a near field communication (NFC) tag).

The wireless communication may include, for example, at least one of cellular communication, wireless fidelity (Wi-Fi), Wi-Fi Direct, Bluetooth, UWB, or NFC. The wired communication may include, for example, at least one of universal serial bus (USB) or high definition multimedia interface (HDMI).

In an embodiment of the disclosure, the communicator 110 may include a communication module for short-range communication. For example, the communicator 110 may include a communication module for performing, in addition to UWB, Wi-Fi, Wi-Fi Direct, Bluetooth, and NFC, various short-range communication such as infrared communication, magnetic secure transmission (MST), and magnetic security communication.

The communicator 110 according to the embodiment of the disclosure may communicate with the controlee 200 by using a first communication scheme or a second communication scheme. For example, the second communication scheme may be a UWB communication scheme, and the first communication scheme may be a communication scheme that is different from the second communication scheme. For example, the first communication scheme may be a Bluetooth communication scheme, but is not limited thereto.

The processor 120 according to the embodiment of the disclosure may control overall operations of the controller 100 by executing programs stored in the memory 130 and may include at least one processor such as a central processing unit (CPU) or a graphics processing unit (GPU). The processor 120 may control other elements included in the controller 100 so as to perform UWB ranging.

The description of FIG. 12 may be applied to a specific method, performed by the processor 120, of performing ranging by controlling overall operations of the controller 100, and redundant descriptions will be omitted.

The processor 120 according to the embodiment of the disclosure may transmit an RCM including block striding information to the controlee 200 through the communicator 110. The block striding information may include information about the number of blocks to be skipped. The processor 120 according to the embodiment of the disclosure may adjust a ranging period between the controller 100 and the controlee 200 by changing the number of blocks to be skipped. Because the RCM including the block striding information has been described with reference to FIGS. 10 and 11, redundant descriptions will be omitted.

The processor 120 according to the embodiment of the disclosure may determine whether to perform hopping based on a result of transmitting the RCM.

As an example, when a message scheduled by the transmitted RCM is not received for a certain time, the processor 120 may determine that transmitting of the RCM failed. For example, when the message scheduled by the RCM is not received during a certain period in a ranging round having a first index value in a first ranging block, the processor 120 may determine that the transmitting of the RCM failed. The processor 120 may determine to perform hopping based on the determination that the transmitting of the RCM failed.

As another example, when a message scheduled by the transmitted RCM is not received within a certain time, the processor 120 may determine that the transmitting of the RCM was successful. When the processor 120 determines that the transmitting of the RCM was successful, the processor 120 may determine not to perform hopping. The processor 120 may determine the index value of the second ranging block to perform ranging, based on the block striding information. Because the processor 120 has determined not to perform hopping, the processor 120 may perform ranging in the ranging round having the first index value among a plurality of ranging rounds included in the second ranging block. The processor 120 according to an embodiment of the disclosure may determine whether all the controlees communicating with the controller 100 for ranging fail to receive the RCM. When all the controlees fail to receive the RCM, the processor 120 may determine not to perform block striding. The processor 120 may not perform block striding and may wake up in the hopping round of the very next ranging block and retransmit the RCM. On the other hand, when all the controlees do not fail to receive the RCM (that is, when the controlee 200 fails to receive the RCM and at least one controlee except for the controlee 200 succeeds in receiving the RCM), the processor 120 according to an embodiment of the disclosure may determine to perform block striding. When the processor 120 determines to perform block striding, the processor 120 may perform operation the following operations.

The processor 120 according to the embodiment of the disclosure may determine a hopping round value based on a result of determining whether to perform the hopping and block striding information. When the processor 120 determines to perform the hopping, the processor 120 may determine a hopping round value based on the block striding information. The processor 120 according to the embodiment of the disclosure may determine the index value of the second ranging block to perform ranging, based on the block striding information. When an index value of a current first ranging block is N (N is an integer greater than or equal to 0) and the processor 120 determines to skip n blocks (n is an integer greater than or equal to 0), the processor 120 may determine N+n+1 as the index value of the second ranging block. The processor 120 may determine a hopping round value based on the index value of the second ranging block.

For example, the processor 120 may determine the hopping round value by taking into account a result value of a random number generation function calculated based on the index value of the second ranging block and a hopping key value for a ranging session. When initiating a ranging session with the controlee 200, the processor 120 may share the hopping key with the controlee 200.

The processor 120 according to the embodiment of the disclosure may perform ranging with the controlee 200 based on the block striding information and the hopping round value. The processor 120 may perform ranging in the second ranging round corresponding to the hopping round value among the ranging rounds included in the second ranging block determined based on the block striding information. When the processor 120 determines to skip n blocks (n is an integer greater than or equal to 0), the processor 120 may skip next n blocks of the first ranging block and perform the ranging operation in an (n+1)th ranging block. After transmitting the RCM in the first ranging block, the processor 120 may perform the ranging operation after 1+n*(block duration).

Also, the processor 120 according to the embodiment of the disclosure may transmit, to a third device, an RCM including second block striding information that is different from the block striding information for the controlee 200. The processor 120 may perform ranging with the third device based on the second block striding information. In order to apply different stride lengths to devices performing ranging, the payload IE of the structure illustrated in FIG. 11 may be used.

Figure 20:
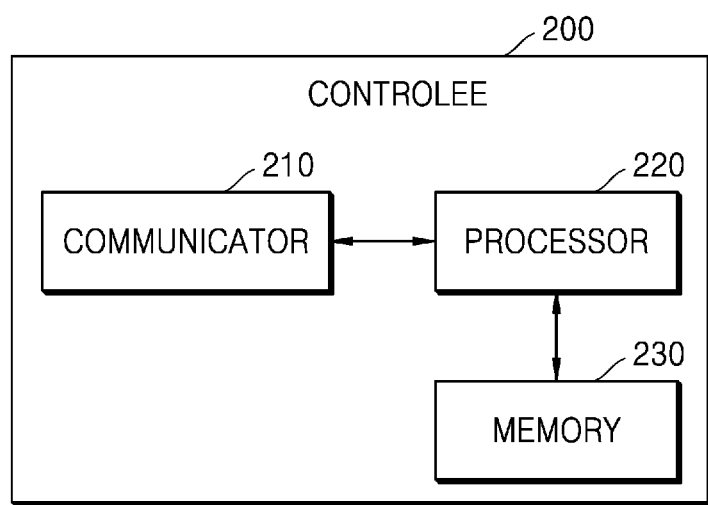
FIG. 20 illustrates a block diagram of a controlee according to an embodiment of the disclosure.

FIG. 20 illustrates a block diagram of a controlee according to an embodiment of the disclosure.

The controlee 200 according to various embodiments of the disclosure may be a fixed terminal or a mobile terminal. The controlee 200 may be, for example, at least one of a smart phone, a navigation, a computer, a digital broadcasting terminal, a smart home appliance, an artificial intelligence speaker, a PDA, a PMP, a smart key, or a wearable device. The controlee 200 may communicate with other devices and/or servers through a network by using a wireless or wired communication scheme.

Referring to FIG. 20, the controlee 200 according to various embodiments of the disclosure may include a communicator 210, a processor 220, and a memory 230. However, the controlee 200 may include more elements or fewer elements than those illustrated in FIG. 20.

In FIG. 20, the controlee 200 is illustrated as including one processor, but the embodiment of the disclosure is not limited thereto. The controlee 200 may include a plurality of processors. Hereinafter, at least part of the operations and functions of the processor 220 may be performed by a plurality of processors. The controlee 200 illustrated in FIG. 20 may perform the operating method according to various embodiments of the disclosure, and the descriptions of FIGS. 1 to 18 may be applied. Therefore, a description redundant to those provided above will be omitted.

The communicator 210 according to the embodiment of the disclosure may perform wired or wireless communication with other devices or networks. To this end, the communicator 210 may include a communication module supporting at least one of various wired and wireless communication methods. For example, the communication module may be in the form of a chipset, or may be a sticker or a bar code including information necessary for communication (e.g., a sticker including an NFC tag).

The wireless communication may include, for example, at least one of cellular communication, Wi-Fi, Wi-Fi Direct, Bluetooth, UWB, or NFC. The wired communication may include, for example, at least one of USB or HDMI.

In an embodiment of the disclosure, the communicator 210 may include a communication module for short-range communication. For example, the communicator 210 may include a communication module for performing, in addition to UWB, Wi-Fi, Wi-Fi Direct, Bluetooth, and NFC, various short-range communication such as infrared communication, MST, and magnetic security communication.

The communicator 210 according to the embodiment of the disclosure may communicate with the controller 100 by using a first communication scheme or a second communication scheme. For example, the second communication scheme may be a UWB communication scheme, and the first communication scheme may be a communication scheme that is different from the second communication scheme. For example, the first communication scheme may be a Bluetooth communication scheme, but is not limited thereto.

The processor 220 according to the embodiment of the disclosure may control overall operations of the controlee 200 by executing programs stored in the memory 230 and may include at least one processor such as a CPU or a GPU. The processor 220 may control other elements included in the controlee 200 so as to perform UWB ranging. The description of FIG. 13 may be applied to a specific method, performed by the processor 220, of performing ranging by controlling overall operations of the controlee 200, and redundant descriptions will be omitted.

The processor 220 according to the embodiment of the disclosure may determine whether to perform hopping based on a result of receiving a first RCM from the controller 100.

When the first RCM is not received during a certain period in a ranging round having a first index value among a plurality of ranging rounds included in a first ranging block, the processor 220 may determine that the receiving of the first RCM failed. The processor 220 may determine to perform hopping based on the determination that the receiving of the first RCM failed.

As another example, when the first RCM is received in the ranging round having the first index value among the ranging rounds included in the first ranging block, the processor 220 may determine that the receiving of the first RCM was successful and may determine not to perform hopping. The processor 220 may determine the index value of the second ranging block to perform ranging. The processor 220 may perform ranging in the ranging round having the first index value among the ranging rounds included in the second ranging block.

The processor 220 according to the embodiment of the disclosure may determine a hopping round value based on a result of determining whether to perform the hopping.

When the processor 220 determines to perform the hopping, the processor 220 may determine the index value of the second ranging block to perform ranging. As an example, when an index value of a current ranging block is N (N is an integer greater than or equal to 0) and a previously negotiated block stride length is 0, the processor 220 may determine N+1 as the index value of the second ranging block. As an example, when the index value of the current ranging block is N and the previously negotiated block stride length is 0, the processor 220 may determine N+n+1 as the index value of the second ranging block.

The processor 220 may determine a hopping round value based on the index value of the second ranging block. The processor 220 may determine the hopping round value by taking into account a result value of a random number generation function calculated based on the index value of the second ranging block and a hopping key value for a ranging session. When initiating a ranging session with the controlee 200, the processor 220 may receive the hopping key from the controller 100.

The processor 220 according to the embodiment of the disclosure may receive a second RCM from the controller 100 based on the hopping round value. The processor 220 may receive the second RCM in the second ranging round corresponding to the hopping round value among the ranging rounds included in the second ranging block.

The processor 220 according to the embodiment of the disclosure may perform ranging with the controller 100 based on block striding information included in the second RCM.

The block striding information may include information about the number of blocks to be skipped. The processor 220 according to the embodiment of the disclosure may adjust a ranging period by changing the number of blocks to be skipped. Because the RCM including the block striding information has been described with reference to FIGS. 10 and 11, redundant descriptions will be omitted.

The processor 220 may determine an index value of a third ranging block to perform ranging, based on the block striding information. When the index value of the second ranging block that has received the second RCM is N (N is an integer greater than or equal to 0) and information indicating that the number of blocks to be skipped is n is included in the second RCM, the processor 220 may determine N+n+1 as the index value of the third ranging block.

The processor 220 may perform ranging in the third ranging round among the ranging rounds included in the third ranging block. The index value of the third ranging round may be the same as the index value of the second ranging round in which the processor 220 receives the second RCM. When the processor 220 according to the embodiment of the disclosure determines that the second RCM was completely received, the processor 220 may stop hopping and repeatedly perform ranging in the ranging round having the same index value as the second ranging round in which the second RCM was received.

The embodiments of the disclosure may be implemented as a software program that includes instructions stored in a computer-readable storage medium.

The computer is a device capable of calling the stored instructions from the storage medium and performing the operations of the embodiment of the disclosure according to the called instructions. The computer may include an image transmitting apparatus and an image receiving apparatus according to the embodiments of the disclosure.

The computer-readable storage medium may be provided in the form of a non-transitory storage medium. The term "non-transitory" means that the storage medium does not include a signal and is tangible, and does not limit that data is stored in the storage medium semi-permanently or temporarily.

Also, the electronic devices or the methods according to the embodiments of the disclosure may be provided in a state of being included in a computer program product. The computer program product may be traded between a seller and a buyer as a product.

The computer program product may include a software program and a computer-readable storage medium on which the software program is stored. For example, the computer program product may include a product (e.g., downloadable app) of a software program form that is distributed electronically through an electronic device manufacturer or an electronic market (e.g., Google Play Store, App Store, etc.).

For electronic distribution, at least part of the software program may be stored in a storage medium or may be temporarily generated. In this case, the storage medium may be a server of a manufacturer, a server of an electronic market, or a storage medium of a relay server temporarily storing a software program.

In a system including a server and a terminal (e.g., an image transmitting apparatus or an image receiving apparatus), the computer program product may include a storage medium of the server or a storage medium of the terminal. Alternatively, when a third device (e.g., a smart phone) communicatively connected to a server or a terminal is present, the computer program product may include a storage medium of the third device. Alternatively, the computer program product may include a software program itself that is transmitted from the server to the terminal or the third device or is transmitted from the third device to the terminal.

In this case, one of the server, the terminal, and the third device may execute the computer program product to perform the methods according to the embodiments of the disclosure. Alternatively, two or more of the server, the terminal, and the third device may execute the computer program product to perform the methods according to the embodiments of the disclosure in a distributed manner.

For example, the server (e.g., a cloud server or an artificial intelligence server, etc.) may execute the computer program product stored in the server to control the terminal communicatively connected to the server to perform the methods according to the embodiments of the disclosure.

As another example, the third device may execute the computer program product to control the terminal communicatively connected to the third device to perform the methods according to the embodiments of the disclosure. As a specific example, the third device may remotely control an image transmitting apparatus or an image receiving apparatus to transmit or receive a packing image.

When the third device executes the computer program product, the third device may download the computer program product from the server and execute the downloaded computer program product. Alternatively, the third device may execute the computer program product provided in a preloaded state to execute the methods according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operating method of a first electronic device for performing ranging by using ultra wide band (UWB) communication, the operating method comprising:
    transmitting, to a second electronic device, a ranging control message including block striding information indicating a number of ranging blocks to be skipped, in a first ranging block;
    identifying an index value of a second ranging block to perform ranging with the second electronic device based on the block striding information and an index value of the first ranging block; and
    performing the ranging with the second electronic device in the second ranging block based on the index value of the second ranging block.

2. The operating method of claim 1, further comprising:
    in case that the number of ranging blocks to be skipped is not zero, skipping the ranging at least one ranging block according to the number of ranging blocks to be skipped.

3. The operating method of claim 1, wherein the index value of the first ranging block is N, the N being an integer greater than or equal to 0, and a block stride length is n, the n being an integer greater than or equal to 0, the identified index value of the second ranging block is determined as N+n+1.

4. The operating method of claim 1, wherein, in case that the number of ranging blocks to be skipped is zero, no ranging block is skipped.

5. The operating method of claim 1, wherein the transmitting of the ranging control message comprises transmitting the ranging control message in a ranging round having a first index value among a plurality of ranging rounds included in the first ranging block.

6. An operating method of a second electronic device for performing ranging by using ultra wide band (UWB) communication, the operating method comprising:
    receiving, from a first electronic device, a ranging control message including block striding information indicating a number of ranging blocks to be skipped, in a first ranging block;
    identifying an index value of a second ranging block to perform ranging with the first electronic device based on the block striding information and an index value of the first ranging block; and
    performing the ranging with the first electronic device in the second ranging block based on the index value of the second ranging block.

7. The operating method of claim 6, further comprising:
    in case that the number of ranging blocks to be skipped is not zero, skipping the ranging at least one ranging block according to the number of ranging blocks to be skipped.

8. The operating method of claim 6, wherein the index value of the first ranging block is N, the N being an integer greater than or equal to 0, and a block stride length is n, the n being an integer greater than or equal to 0, the identified index value of the second ranging block is determined as N+n+1.

9. The operating method of claim 6, wherein, in case that the number of ranging blocks to be skipped is zero, no ranging block is skipped.

10. The operating method of claim 6, wherein the receiving of the ranging control message comprises receiving the ranging control message in a ranging round having a first index value among a plurality of ranging rounds included in the first ranging block.

11. A first electronic device for performing ranging by using ultra wide band (UWB) communication, the first electronic device comprising:
    a transceiver;
    a memory; and
    at least one processor configured to execute a program stored in the memory to control the first electronic device to:
        transmit, to a second electronic device, a ranging control message including block striding information indicating a number of ranging blocks to be skipped, in a first ranging block;
        identify an index value of a second ranging block to perform ranging with the second electronic device based on the block striding information and an index value of the first ranging block; and perform the ranging with the second electronic device in the second ranging block based on the index value of the second ranging block.

12. A second electronic device for performing ranging by using ultra wide band (UWB) communication, the second electronic device comprising:
- a transceiver;
- a memory; and
- at least one processor configured to execute a program stored in the memory to control the second electronic device to:
  - receive, from a first electronic device, a ranging control message including block striding information indicating a number of ranging blocks to be skipped, in a first ranging block;
  - identify an index value of a second ranging block to perform ranging with the first electronic device based on the block striding information and an index value of the first ranging block; and
  - perform the ranging with the first electronic device in the second ranging block based on the index value of the second ranging block.

* * * * *